(12) United States Patent
Morton et al.

(10) Patent No.: US 9,542,393 B2
(45) Date of Patent: Jan. 10, 2017

(54) METHOD AND SYSTEM FOR INDEXING AND SEARCHING TIMED MEDIA INFORMATION BASED UPON RELEVANCE INTERVALS

(71) Applicant: Streamsage, Inc., Washington, DC (US)

(72) Inventors: Michael Scott Morton, Washington, DC (US); Sibley Verbeck Simon, Wahington, DC (US); Noam Carl Unger, Somerville, MA (US); Robert Rubinoff, Potomac, MD (US); Anthony Ruiz Davis, Takoma Park, MD (US); Kyle Aveni-Deforge, Columbia, SC (US)

(73) Assignee: Streamsage, Inc., Washington, DC (US)

(*) Notice: Subject to any disclaimer, the term of this patent is extended or adjusted under 35 U.S.C. 154(b) by 0 days.

(21) Appl. No.: 14/843,912

(22) Filed: Sep. 2, 2015

(65) Prior Publication Data

US 2016/0098396 A1    Apr. 7, 2016

Related U.S. Application Data

(63) Continuation of application No. 14/176,367, filed on Feb. 10, 2014, now Pat. No. 9,244,973, which is a (Continued)

(51) Int. Cl.
*G06F 17/30* (2006.01)
*G06F 17/27* (2006.01)

(52) U.S. Cl.
CPC ..... *G06F 17/3002* (2013.01); *G06F 17/30029* (2013.01); *G06F 17/30064* (2013.01); (Continued)

(58) Field of Classification Search
CPC ............ G06F 17/3002; G06F 17/30029; G06F 17/30613; G06F 17/30796; G06F 17/30684; G06F 17/2705; G06F 17/274; G06F 17/275; G06F 17/28; G06F 17/2785

See application file for complete search history.

(56) References Cited

U.S. PATENT DOCUMENTS

| 4,227,177 A | 10/1980 | Moshier |
|---|---|---|
| 5,493,677 A | 2/1996 | Balogh et al. |

(Continued)

FOREIGN PATENT DOCUMENTS

| CA | 2685833 A1 | 5/2010 |
|---|---|---|
| EP | 1241587 A1 | 9/2002 |

(Continued)

OTHER PUBLICATIONS

Canadian Office Action—Ca App 2,695,709—dated Jun. 20, 2016.
(Continued)

*Primary Examiner* — Cheryl Lewis
(74) *Attorney, Agent, or Firm* — Banner & Witcoff, Ltd.

(57) ABSTRACT

A method and system for indexing, searching, and retrieving information from timed media files based upon relevance intervals. The method and system for indexing, searching, and retrieving this information is based upon relevance intervals so that a portion of a timed media file is returned, which is selected specifically to be relevant to the given information representations, thereby eliminating the need for a manual determination of the relevance and avoiding missing relevant portions. The timed media includes streaming audio, streaming video, timed HTML, animations such as vector-based graphics, slide shows, other timed media, and combinations thereof.

20 Claims, 16 Drawing Sheets

Related U.S. Application Data continuation of application No. 13/955,582, filed on Jul. 31, 2013, now Pat. No. 8,706,735, which is a continuation of application No. 13/347,914, filed on Jan. 11, 2012, now Pat. No. 8,527,520, which is a continuation of application No. 12/349,934, filed on Jan. 7, 2009, now Pat. No. 8,117,206, which is a continuation of application No. 10/364,408, filed on Feb. 12, 2003, now Pat. No. 7,490,092, which is a continuation-in-part of application No. 09/611,316, filed on Jul. 6, 2000, now abandoned.

(60) Provisional application No. 60/356,632, filed on Feb. 12, 2002.

(52) U.S. Cl.
CPC .. *G06F 17/30424* (2013.01); *G06F 17/30613* (2013.01); *G06F 17/30796* (2013.01); *G06F 17/274* (2013.01); *G06F 17/2705* (2013.01); *G06F 17/275* (2013.01); *G06F 17/30684* (2013.01); *Y10S 707/913* (2013.01); *Y10S 707/99931* (2013.01); *Y10S 707/99935* (2013.01)

(56) References Cited

U.S. PATENT DOCUMENTS

| | | |
|---|---|---|
| 5,521,841 A | 5/1996 | Arman et al. |
| 5,530,859 A | 6/1996 | Tobias, II et al. |
| 5,535,063 A | 7/1996 | Lamming |
| 5,553,281 A | 9/1996 | Brown et al. |
| 5,576,755 A | 11/1996 | Davis et al. |
| 5,594,897 A | 1/1997 | Goffman |
| 5,640,553 A | 6/1997 | Schultz |
| 5,649,182 A | 7/1997 | Reitz |
| 5,666,528 A | 9/1997 | Thai |
| 5,682,326 A | 10/1997 | Klingler et al. |
| 5,717,914 A | 2/1998 | Husick et al. |
| 5,729,741 A | 3/1998 | Liaguno et al. |
| 5,737,495 A | 4/1998 | Adams et al. |
| 5,737,734 A | 4/1998 | Schultz |
| 5,742,816 A | 4/1998 | Barr et al. |
| 5,761,655 A | 6/1998 | Hoffman |
| 5,765,150 A | 6/1998 | Burrows |
| 5,799,315 A | 8/1998 | Rainey et al. |
| 5,819,292 A | 10/1998 | Hitz et al. |
| 5,845,279 A | 12/1998 | Garofalakis et al. |
| 5,857,200 A | 1/1999 | Togawa |
| 5,924,090 A | 7/1999 | Krellenstein |
| 5,928,330 A | 7/1999 | Goetz et al. |
| 5,937,422 A | 8/1999 | Nelson et al. |
| 5,956,729 A | 9/1999 | Goetz et al. |
| 5,982,369 A | 11/1999 | Sciammarella et al. |
| 6,038,560 A | 3/2000 | Wical |
| 6,052,657 A | 4/2000 | Yamron et al. |
| 6,055,543 A | 4/2000 | Christensen et al. |
| 6,058,392 A | 5/2000 | Sampson et al. |
| 6,167,377 A | 12/2000 | Gillick et al. |
| 6,188,976 B1 | 2/2001 | Ramaswamy et al. |
| 6,278,992 B1 | 8/2001 | Curtis et al. |
| 6,320,588 B1 | 11/2001 | Palmer et al. |
| 6,343,294 B1 | 1/2002 | Hawley |
| 6,345,253 B1 | 2/2002 | Viswanathan |
| 6,363,380 B1 | 3/2002 | Dimitrova |
| 6,366,296 B1 | 4/2002 | Boreczky et al. |
| 6,374,260 B1 | 4/2002 | Hoffert et al. |
| 6,415,434 B1 | 7/2002 | Kind |
| 6,418,431 B1 | 7/2002 | Mahajan et al. |
| 6,463,444 B1 | 10/2002 | Jain et al. |
| 6,545,209 B1 | 4/2003 | Flannery et al. |
| 6,546,385 B1 | 4/2003 | Mao et al. |
| 6,567,980 B1 | 5/2003 | Jain et al. |
| 6,580,437 B1* | 6/2003 | Liou .............. G06F 17/3028 707/E17.012 |
| 6,675,174 B1 | 1/2004 | Bolle et al. |
| 6,698,020 B1 | 2/2004 | Zigmond et al. |
| 6,771,875 B1 | 8/2004 | Kunieda et al. |
| 6,789,088 B1 | 9/2004 | Lee et al. |
| 6,792,426 B2 | 9/2004 | Baumeister et al. |
| 6,877,134 B1 | 4/2005 | Fuller et al. |
| 6,882,793 B1 | 4/2005 | Fu et al. |
| 6,901,364 B2 | 5/2005 | Nguyen et al. |
| 6,937,766 B1 | 8/2005 | Wilf et al. |
| 6,970,639 B1 | 11/2005 | McGrath et al. |
| 7,155,392 B2* | 12/2006 | Schmid .............. G10L 15/1822 704/251 |
| 7,177,861 B2 | 2/2007 | Tovinkere et al. |
| 7,206,303 B2 | 4/2007 | Karas et al. |
| 7,272,558 B1 | 9/2007 | Soucy et al. |
| 7,376,642 B2 | 5/2008 | Nayak et al. |
| 7,472,137 B2 | 12/2008 | Edelstein et al. |
| 7,490,092 B2 | 2/2009 | Sibley et al. |
| 7,548,934 B1 | 6/2009 | Platt et al. |
| 7,584,102 B2 | 9/2009 | Hwang et al. |
| 7,739,286 B2 | 6/2010 | Sethy et al. |
| 7,788,266 B2 | 8/2010 | Venkataraman et al. |
| 7,792,812 B1 | 9/2010 | Carr |
| 7,814,267 B1 | 10/2010 | Iyengar et al. |
| 7,921,116 B2 | 4/2011 | Finkelstein et al. |
| 7,925,506 B2 | 4/2011 | Farmaner et al. |
| 7,958,119 B2 | 6/2011 | Eggink et al. |
| 7,983,902 B2 | 7/2011 | Wu et al. |
| 8,041,566 B2 | 10/2011 | Peters et al. |
| 8,078,467 B2 | 12/2011 | Wu et al. |
| 8,117,206 B2 | 2/2012 | Sibley et al. |
| 8,265,933 B2 | 9/2012 | Bates et al. |
| 8,527,520 B2 | 9/2013 | Morton et al. |
| 8,572,087 B1 | 10/2013 | Yagnik |
| 2001/0014891 A1 | 8/2001 | Hoffert et al. |
| 2002/0035573 A1 | 3/2002 | Black et al. |
| 2002/0087315 A1 | 7/2002 | Lee et al. |
| 2002/0143774 A1 | 10/2002 | Vandersluis |
| 2002/0194181 A1 | 12/2002 | Wachtel |
| 2003/0014758 A1 | 1/2003 | Kim |
| 2003/0033297 A1 | 2/2003 | Ogawa |
| 2003/0050778 A1 | 3/2003 | Nguyen et al. |
| 2003/0061028 A1 | 3/2003 | Dey et al. |
| 2003/0093790 A1 | 5/2003 | Logan et al. |
| 2003/0135582 A1 | 7/2003 | Allen et al. |
| 2003/0163443 A1 | 8/2003 | Wang |
| 2003/0163815 A1 | 8/2003 | Begeja et al. |
| 2003/0195877 A1 | 10/2003 | Ford et al. |
| 2003/0204513 A1 | 10/2003 | Bumbulis |
| 2004/0111465 A1 | 6/2004 | Chuang et al. |
| 2004/0117831 A1 | 6/2004 | Ellis et al. |
| 2004/0139091 A1 | 7/2004 | Shin |
| 2004/0215634 A1 | 10/2004 | Wakefield et al. |
| 2004/0225667 A1 | 11/2004 | Hu et al. |
| 2004/0243539 A1 | 12/2004 | Skurtovich et al. |
| 2004/0254795 A1 | 12/2004 | Fujii et al. |
| 2004/0267700 A1 | 12/2004 | Dumais et al. |
| 2005/0044105 A1 | 2/2005 | Terrell |
| 2005/0060647 A1 | 3/2005 | Doan et al. |
| 2005/0091443 A1 | 4/2005 | Hershkovich et al. |
| 2005/0097138 A1 | 5/2005 | Kaiser et al. |
| 2005/0114130 A1 | 5/2005 | Java et al. |
| 2005/0152362 A1 | 7/2005 | Wu |
| 2005/0193005 A1 | 9/2005 | Gates et al. |
| 2005/0222975 A1 | 10/2005 | Nayak et al. |
| 2006/0037046 A1 | 2/2006 | Simms et al. |
| 2006/0074671 A1 | 4/2006 | Farmaner et al. |
| 2006/0088276 A1 | 4/2006 | Cho et al. |
| 2006/0100898 A1 | 5/2006 | Pearce et al. |
| 2006/0112097 A1 | 5/2006 | Callaghan et al. |
| 2006/0156399 A1 | 7/2006 | Parmar et al. |
| 2006/0161546 A1 | 7/2006 | Callaghan et al. |
| 2006/0167859 A1 | 7/2006 | Verbeck Sibley et al. |
| 2006/0212288 A1 | 9/2006 | Sethy et al. |
| 2006/0235843 A1 | 10/2006 | Musgrove et al. |
| 2006/0253780 A1 | 11/2006 | Munetsugu et al. |
| 2006/0256739 A1 | 11/2006 | Seier et al. |

(56) References Cited

U.S. PATENT DOCUMENTS

| | | |
|---|---|---|
| 2007/0011133 A1 | 1/2007 | Chang |
| 2007/0050343 A1 | 3/2007 | Siddaramappa et al. |
| 2007/0050366 A1 | 3/2007 | Bugir et al. |
| 2007/0067285 A1 | 3/2007 | Blume et al. |
| 2007/0078708 A1 | 4/2007 | Yu et al. |
| 2007/0083374 A1 | 4/2007 | Bates et al. |
| 2007/0156677 A1 | 7/2007 | Szabo |
| 2007/0208567 A1 | 9/2007 | Amento et al. |
| 2007/0211762 A1 | 9/2007 | Song et al. |
| 2007/0214123 A1 | 9/2007 | Messer et al. |
| 2007/0214488 A1 | 9/2007 | Nguyen et al. |
| 2007/0233487 A1 | 10/2007 | Cohen et al. |
| 2007/0233656 A1 | 10/2007 | Bunescu et al. |
| 2007/0239707 A1 | 10/2007 | Collins et al. |
| 2007/0250901 A1 | 10/2007 | McIntire et al. |
| 2007/0260700 A1 | 11/2007 | Messer |
| 2007/0271086 A1 | 11/2007 | Peters et al. |
| 2008/0033915 A1 | 2/2008 | Chen et al. |
| 2008/0046929 A1 | 2/2008 | Cho et al. |
| 2008/0059418 A1 | 3/2008 | Barsness et al. |
| 2008/0091633 A1 | 4/2008 | Rappaport et al. |
| 2008/0118153 A1 | 5/2008 | Wu et al. |
| 2008/0133504 A1 | 6/2008 | Messer et al. |
| 2008/0162533 A1 | 7/2008 | Mount et al. |
| 2008/0163328 A1 | 7/2008 | Philbin et al. |
| 2008/0168045 A1 | 7/2008 | Suponau et al. |
| 2008/0183681 A1 | 7/2008 | Messer et al. |
| 2008/0183698 A1 | 7/2008 | Messer et al. |
| 2008/0189110 A1 | 8/2008 | Freeman et al. |
| 2008/0204595 A1 | 8/2008 | Rathod et al. |
| 2008/0208796 A1 | 8/2008 | Messer et al. |
| 2008/0208839 A1 | 8/2008 | Sheshagiri et al. |
| 2008/0208864 A1 | 8/2008 | Cucerzan et al. |
| 2008/0221989 A1 | 9/2008 | Messer et al. |
| 2008/0222105 A1 | 9/2008 | Matheny |
| 2008/0222106 A1 | 9/2008 | Rao et al. |
| 2008/0222142 A1 | 9/2008 | O'Donnell |
| 2008/0235209 A1 | 9/2008 | Rathod et al. |
| 2008/0235393 A1 | 9/2008 | Kunjithapatham et al. |
| 2008/0250010 A1 | 10/2008 | Rathod et al. |
| 2008/0256097 A1 | 10/2008 | Messer et al. |
| 2008/0266449 A1 | 10/2008 | Rathod et al. |
| 2008/0281801 A1 | 11/2008 | Larson et al. |
| 2008/0288641 A1 | 11/2008 | Messer et al. |
| 2008/0319962 A1 | 12/2008 | Riezler et al. |
| 2009/0006315 A1 | 1/2009 | Mukherjea et al. |
| 2009/0006391 A1 | 1/2009 | Ram |
| 2009/0013002 A1 | 1/2009 | Eggink et al. |
| 2009/0025054 A1 | 1/2009 | Gibbs et al. |
| 2009/0055381 A1 | 2/2009 | Wu et al. |
| 2009/0077078 A1 | 3/2009 | Uppala et al. |
| 2009/0083257 A1 | 3/2009 | Bargeron et al. |
| 2009/0094113 A1 | 4/2009 | Berry et al. |
| 2009/0123021 A1 | 5/2009 | Jung et al. |
| 2009/0144260 A1 | 6/2009 | Bennett et al. |
| 2009/0144609 A1 | 6/2009 | Liang et al. |
| 2009/0157680 A1 | 6/2009 | Crossley et al. |
| 2009/0172544 A1 | 7/2009 | Tsui et al. |
| 2009/0198686 A1 | 8/2009 | Cushman, II et al. |
| 2009/0204599 A1 | 8/2009 | Morris et al. |
| 2009/0205018 A1 | 8/2009 | Ferraiolo et al. |
| 2009/0240650 A1 | 9/2009 | Wang et al. |
| 2009/0240674 A1 | 9/2009 | Wilde et al. |
| 2009/0271195 A1 | 10/2009 | Kitade et al. |
| 2009/0282069 A1 | 11/2009 | Callaghan et al. |
| 2009/0326947 A1 | 12/2009 | Arnold et al. |
| 2010/0042602 A1 | 2/2010 | Smyros et al. |
| 2010/0070507 A1 | 3/2010 | Mori |
| 2010/0094845 A1 | 4/2010 | Moon et al. |
| 2010/0138653 A1 | 6/2010 | Spencer et al. |
| 2010/0250598 A1 | 9/2010 | Brauer et al. |
| 2011/0004462 A1 | 1/2011 | Houghton et al. |
| 2011/0016106 A1 | 1/2011 | Xia |
| 2011/0077943 A1 | 3/2011 | Miki et al. |
| 2011/0125728 A1 | 5/2011 | Smyros et al. |
| 2011/0191099 A1 | 8/2011 | Farmaner et al. |
| 2011/0246503 A1 | 10/2011 | Bender et al. |
| 2012/0036119 A1 | 2/2012 | Zwicky et al. |
| 2012/0078932 A1 | 3/2012 | Skurtovich, Jr. et al. |
| 2012/0150636 A1 | 6/2012 | Freeman et al. |
| 2012/0191695 A1 | 7/2012 | Xia |
| 2013/0054589 A1 | 2/2013 | Cheslow |

FOREIGN PATENT DOCUMENTS

| | | |
|---|---|---|
| EP | 1462950 A1 | 9/2004 |
| EP | 1501305 A1 | 1/2005 |
| GB | 2448874 A | 11/2008 |
| GB | 2448875 A | 11/2008 |
| WO | 9950830 A1 | 10/1999 |
| WO | 0205135 A2 | 1/2002 |
| WO | 2005/050621 A2 | 6/2005 |
| WO | 2006099621 A1 | 9/2006 |
| WO | 2007115224 A2 | 10/2007 |
| WO | 2008053132 A1 | 5/2008 |
| WO | 2009052277 A1 | 4/2009 |

OTHER PUBLICATIONS

Canadian Office Action—CA Appl. 2,689,376—dated Feb. 23, 2016.

Chen, Langzhou, et al. "Using information retrieval methods for language model adaptation." Interspeech. 2001.

Sethy, Abhinav, Pananyiotis G. Georgiou, and Shrikanth Narayanan. "Building topic specific language models from webdata using competitive models." Interspeech. 2005.

Response to European Office Action—EP Appl. 9180762.8—Submitted Jul. 29, 2015.

European Office Action—EP Appl. 10162666.1—dated Jul. 10, 2015.

Response to European Office Action—EP 10162666.1—Dated Oct. 14, 2015.

Response to European Office Action—EP Appl. 10154725.5—submitted Oct. 14, 2015.

Canadian Office Action—CA Application 2,697,565—dated Dec. 15, 2015.

U.S. Appl. No. 12/344,713, filed Dec. 29, 2008, Merging of Multiple Data Sets.

U.S. Appl. No. 12/415,734, filed Mar. 31, 2009, An Efficient Scheme for Storing and Reading Encoded Data for Prefix-Based Keyword Search in an Object-Oriented Implementation.

U.S. Appl. No. 12/496,081, filed Jul. 1, 2009, Generating Topic-Specific Language Models.

U.S. Appl. No. 12/343,779, filed Dec. 24, 2008, Identification of Segments within Audio, Video, and Multimedia Items.

U.S. Appl. No. 13/464,186, filed May 4, 2012, Ranking Search Results.

U.S. Appl. No. 14/012,289, filed Aug. 28, 2013, Disambiguation and Tagging of Entities.

U.S. Appl. No. 14/199,063, filed Mar. 6, 2014, Method and Apparatus for Organizing Segments of Media Assets and Determining Relevance of Segments to a Query.

Canadian Office Action—CA Appl. 2,688,921—mailed Feb. 16, 2016.

Canadian Office Action—CA Appl. 2,703,569—dated Apr. 19, 2016.

Canadian Office Action—CA Appl. 2,708,842—dated May 9, 2016.

Canadian Office Action—CA Appl. 2,694,943—dated Jun. 1, 2016.

European Office Action—EP Appl. 09815446.1—dated Feb. 17, 2016.

Shahraray: "Impact and Applications of Video Content Analysis and Coding in the internet and Telecommunications", AT&T Labs Reseach, A Position Statement for Panel 4: Applications the 1998 International Workshop on Very Low Bitrate Video Coding, 3 pages.

Kalina Bontcheva et al "Shallow Methods for Named Entity Coreference Resolution", Proc of Taln 2002, Jan. 1, 2002.

Raphael Volz et al., "Towards ontology-based disambiguation of geographical identifiers", Proceedings of the WWW2007 Workshop

(56) References Cited

OTHER PUBLICATIONS

I3: Identity, Identifiers, Identification, Entity-Centric Approaches to Information and Knowledge Management on the Web, Jan. 1, 2007.
Wacholder N et al., "Disambiguation of Proper Names in Text", Proceedings of the Conference on Applied Natural Language Processing, Association Computer Linguistics, Morrisontown, NJ, Mar. 1, 2007.
Boulgouris N. V. et al., "Real-Time Compressed-Domain Spatiotemporal Segmentation and Ontologies for Video Indexing and Retrieval", IEEE Transactions on Circuits and Systems for Video Technology, vol. 14, No. 5, pp. 606-621, May 2004.
Changsheng Xu et al., "Using Webcast Text for Semantic Event Detection in Broadcast Sports Video", IEEE Transactions on Multimedia, vol. 10, No. 7, pp. 1342-1355, Nov. 2008.
Liang Bai et al., "Video Semantic Content Analysis based on Ontology", International Machine Vision and Image Processing Conference, pp. 117-124, Sep. 2007.
Koskela M. et al., "Measuring Concept Similarities in Multimedia Ontologies: Analysis and Evaluations", IEEE Transactions on Multimedia, vol. 9, No. 5, pp. 912-922, Aug. 2007.
Steffen Staab et al., "Semantic Multimedia", Reasoning Web; Lecture Notes in Computer Science, pp. 125-170, Sep. 2008.
European Search Report EP09179987.4, dated Jun. 4, 2010.
Li, Y. et al., "Reliable Video Clock Time Recognition," Pattern Recognition, 2006, 1CPR 1006, 18th International Conference on Pattern Recognition, 4 pages.
Salton et al., Computer Evaluation of Indexing and Text Processing Journal of the Association for Computing Machinery, vol. 15, No. 1, Jan. 1968, pp. 8-36.
European Search Report for Appolocation No. 09180776.8, mailed Jun. 7, 2010, 9 pages.
European Search Report EP 09180762, dated Mar. 22, 2010.
European Application No. 09175979.5—Office Action mailed Mar. 15, 2010.
EP Application No. 09 175 979.5—Office Action mailed Apr. 11, 2011.
Smith, J.R. et al., "An Image and Video Search Engine for the World-Wide Web" Storage and Retrieval for Image and Video Databases 5, San Jose, Feb. 13-14, 1997, Proceedings of Spie, Belingham, Spie, US, vol. 3022, Feb. 13, 1997, pp. 84-95.
Kontothoanassis, Ledonias et al. "Design, Implementation, and Analysis of a Multimedia Indexing and Delivery Server", Technical Report Series, Aug. 1999, Cambridge Research Laboratory.
European Patent Application No. 09175979.5—Office Action dated Dec. 13, 2011.
International Preliminary Examination Report for PCT/US01/20894, dated Feb. 4, 2002.
Towards a Multimedia World-Wide Web Information retrieval engines, Sougata Mukherjea, Kyoji Hirata, and Yoshinori Hara Computer Networks and ISDN Systems 29 (1997) 1181-1191.
Experiments in Spoken Document Retrieval at CMU, M.A. Siegler, M.J. Wittbrock, S.T. Slattery, K. Seymore, R.E. Jones, and A.G. Hauptmann, School of Computer Science Camegie Mellon University, Pittsburgh, PA 15213-3890, Justsystem Pittsburgh Reasearch Center, 4616 Henry Street, Pittsburgh, PA 15213, 1997.
Eberman, et al., "Indexing Multimedia for the Internet", Compaq, Cambridge Research laboratory, Mar. 1999, pp. 1-8 and Abstract.
Ishitani, et al., "Logical Structure Analysis of Document Images Based on Emergent Computation", IEEE Publication, pp. 189-192, Jul. 1999.
First Office Action in EP01950739.1-1244 dated Mar. 27, 2009.
Chen, "Extraction of Indicative Summary Sentences from Imaged Documents", IEEE publication, 1997, pp. 227-232.
Messer, Alan et al., "SeeNSearch: A context Directed Search Facilitator for Home Entertainment Devices", Paper, Samsung Information Systems America Inc., San Jose, CA, Sep. 17, 2008.
Hsin-Min Wang and Berlin Chen, "Content-based Language Models for Spoken Document Retrieval", ACM, 2000, pp. 149-155.
Marin, Feldman, Ostendorf and Gupta, "Filtering Web Text to Match Target Genres", International Conference on Acoustics, Speech and Signal Processing, 2009, Piscataway, NJ, Apr. 19, 2009, pp. 3705-3708.
European Search Report for application No. 10167947.0, mailed Sep. 28, 2010.
"Ying Zhang and Phil Vines. 2004. Using the web for automated translation extraction in cross-language information retrieval. In Proceedings of the 27th annual international ACM SIGIR conference on Research and development in information retrieval (SIGIR '04). ACM, New York, NY, USA, 162-169".
IPRP PCT/US2009/069644—Jun. 29, 2011.
ISR PCT/US2009/069644—Mar. 4, 2010.
ESR—EP10154725.5—Nov. 2, 2010.
ESR—EP10155340.2—Nov. 25, 2010.
Partial ESR—EP10155340.2—Jul. 12, 2010.
ESR—EP10162666.1—Aug. 4, 2011.
ESR—EP10167947.0—Sep. 28, 2010.
ISR PCT/US2001/020894—Nov. 25, 2003.
Extended European Search Report—EP 09815446.1—mailing date: May 7, 2013.
Behrang Mohit and Rebecca Hwa, 2005. Syntax-based Semi-Supervised Named Entity Tagging. In Proceedings of the ACL Interactive Poster and Demonstration Sessions, pp. 57-60.
Shumeet Baluja, Vibhu Mittal and Rahul Sukthankar, 1999. Applying machine learning for high performance named-entity extraction. In Proceedings of Pacific Association for Computational Linguistics.
R. Bunescu and M. Pasca. 2006. Using encyclopedic knowledge for named entity disambiguation. In Proceedings of EACL-2006, pp. 9-16.
S. Cucerzan. 2007. Large-Scale Named Entity Disambiguation Based on Wikipedia Data. In Proceedings of EMNLP-CoNLL 2007, pp. 708-716.
Radu Florian, 2002. Named entity recognition as a house of cards: Classifier stacking. In Proceedings of CoNL2002, pp. 175-178.
Martin Jansche, 2002, Named Entity Extractinon with Conditional Markov Models and Classifiers. In Proceedings of CoNLL-2002.
Thamar Solorio, 2004. Improvement of Named Entity Tagging by Machine Learning. Reporte Tecnico No. CCC-04-004. INAOE.
European Examination—EP Appl. 09180762.8—Dated Jan. 19, 2015.
Canadian Office Action Response—CA App 2,694,943—Filed Apr. 24, 2015.
European Office Action—EP 10154725.5—Dated Apr. 24, 2015.

* cited by examiner

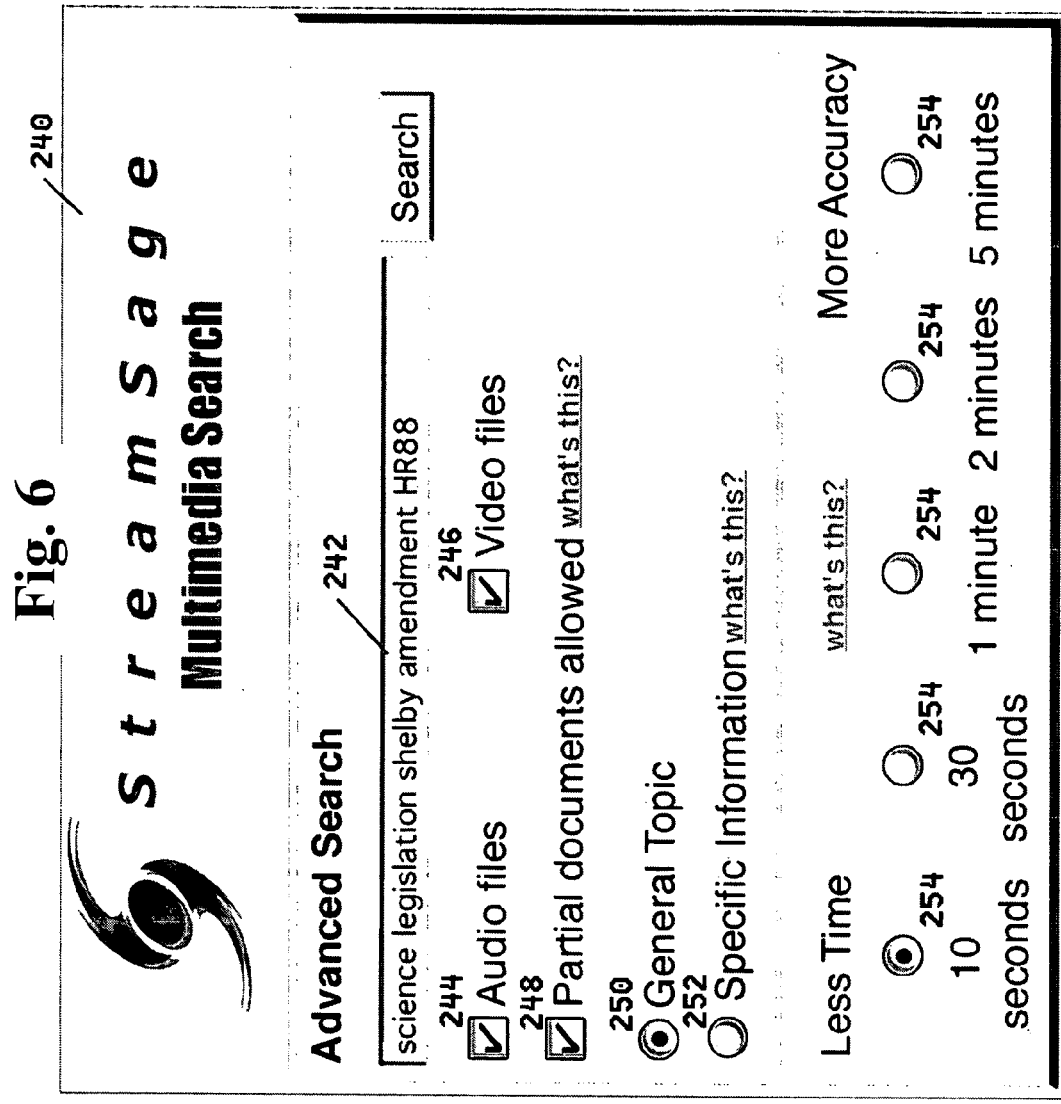

Fig. 7

15 Results found for: science legislation shelby HR88

| Play Checked | Sort by Document | Time Interval | Sort by Date | 1-10 next |
|---|---|---|---|---|
| ☐ 100% | "The Future of Science and Education" Congressman Rush Holt<br>A requirement was slipped in, at the time known as the Shelby Amendment, that would force data... | 21:38-22:14<br>24:36-24:48<br>27:40-28:13<br>full document | text transcript<br>full summary 15 Apr 00 | find similar |
| ☐ 95% | Video interview with Tennessee Senator Bill Frist discussing minimum wage, science legislation and abortion<br>I feel that we need to support legislation that encourages students to embrace scientific inquiry... | 6:13-7:02<br>full document | text transcript<br>full summary 26 Mar 00 | find similar |

Fig. 10

| Word # | Word | Relationship | Centrality |
|---|---|---|---|
| 1 | This | Determiner of 2 | 0.2 |
| 2 | week | Modifier of 5 | 0.8 |
| 3 | NASA | Adjective of 4 | 0.8 |
| 4 | officials | Argument of 5 | 1.0 |
| 5 | invited | Verb | 1.0 |
| 6 | scientists | Argument of 5 | 1.0 |
| 7 | to | Verb | 1.0 |
| 8 | submit | Verb | 1.0 |
| 9 | proposals | Argument of 8 | 1.0 |
| 10 | for | Preposition of 9 | 0.12 |
| 11 | a | Determiner of 13 | 0.12 |
| 12 | new | Adjective of 13 | 0.3 |
| 13 | mission | Object of 10 | 0.6 |

METHOD AND SYSTEM FOR INDEXING AND SEARCHING TIMED MEDIA INFORMATION BASED UPON RELEVANCE INTERVALS

CROSS-REFERENCE TO RELATED APPLICATIONS

This application is a continuation of U.S. patent application Ser. No. 14/176,367, filed Feb. 10, 2014 (now U.S. Pat. No. 9,244,973), which is a continuation of U.S. patent application Ser. No. 13/955,582, filed Jul. 31, 2013 (now U.S. Pat. No. 8,706,735), which is a continuation of U.S. patent application Ser. No. 13/347,914, filed Jan. 11, 2012 (now U.S. Pat. No. 8,527,520), which is a continuation of U.S. patent application Ser. No. 12/349,934, filed Jan. 7, 2009 (now U.S. Pat. No. 8,117,206), which is a continuation of U.S. patent application Ser. No. 10/364,408, filed Feb. 12, 2003 (now U.S. Pat. No. 7,490,092), which is a continuation-in-part of U.S. patent application Ser. No. 09/611,316, filed Jul. 6, 2000 (now abandoned), and claims the benefit of U.S. Provisional Patent Application Ser. No. 60/356,632, filed Feb. 12, 2002. Each of these applications is incorporated by reference in its entirety.

STATEMENT REGARDING FEDERALLY SPONSORED RESEARCH OR DEVELOPMENT

A portion of this invention was made with United States Government support under ATP Award #70NANB1H3037 awarded by the National Institute of Standards and Technology (NIST).

The United States Government has certain rights in the invention.

REFERENCE TO SEQUENCE LISTING, A TABLE, OR A COMPUTER PROGRAM LISTING COMPACT DISK APPENDIX

Not Applicable

BACKGROUND OF THE INVENTION

Field of the Endeavor

The present invention relates to a method and system for indexing and searching timed media based upon relevance intervals. More particularly, the present invention relates to a method and system for indexing and searching timed media based upon relevance intervals that returns portions of timed media files that are selected as specifically relevant to the given information representations, thereby eliminating the need for a manual determination of the relevance, replacing manual editing processes, and avoiding missing relevant portions. The timed media includes streaming audio, streaming video, timed HTML, animations such as vector-based graphics, slide shows, other timed media, and combinations thereof. The method and system of the present invention determines the relevant portion of the media around each occurrence of the information representation rather than requiring the user to perform such functions.

Background of the Invention

The rapid growth of the Internet encompasses rapid growth in the use of real-time, digital timed media such as Web-based conferencing, e-learning, presentations, training, events, corporate communications, radio broadcasts, and other broadcasting. Such new types of media are becoming commonplace methods of communication. As the use of timed media communication tools continues to gain popularity, storehouses of timed media files are growing to meet this new demand. Organizations require tools capable of capturing, indexing, and retrieving the massive amount of information contained within such mediums of communication.

Traditionally, search engines create a large table that is indexed by words, phrases, or other information such as hyperlinks. Each word or phrase points to documents that contain it. The pointing is rated by a relevance magnitude that is calculated by some algorithm, typically including information such as the frequency with which the word or phrase appears and whether it occurs in the title, keywords, etc. Advanced search engines augment the foregoing system by adding the capability to check synonyms or by letting the user indicate the intended definition of the word in question, either by choosing it manually or by entering a natural language query. Other functions are plentiful, such as putting the words searched for in bold in an HTML document or organizing the returned results into customized folders, as is done by Northern Light®.

While the foregoing search engines are excellent models for static documents, their usefulness is minimal for timed media, such as an audio or video file. Due to the unidirectional movement of human consciousness through space-time, a user cannot simultaneously experience more than one point of a timed media file. As a result, the ability of the user to find a relevant portion within a timed media file, once they have found the file itself, is greatly constrained. Therefore, a useful timed media search and retrieval system must not only assist the user in locating a relevant file, but must also assist the user in locating the relevant portions of that file.

Due to the time-dependent nature of viewing such timed media files, locating relevant information contained within timed media files is even more complicated than locating information contained in static text-based files. When searching static text-based files, a user can review the text by seeking occurrences of search terms from within any text viewing application. In contrast, when searching timed media files, a user cannot judge the detailed content of the file any faster than by playing the file through from beginning to end. If only a small portion of a video is of interest to a particular viewer, for example, it is unlikely he or she will identify that portion without viewing the entire file.

Attempts have been made to provide search capability for timed media files. Conventional timed media search systems attempt to solve the foregoing problem by segmenting the timed media files into short sections. The precise length of such sections or scenes is usually determined automatically by sudden visual changes in the timed media, such as those caused by an edit or cut; manually by a human editor; or arbitrarily into clips of roughly uniform length. Each scene is then indexed as if it were a separate document, usually with the help of manually entered keywords. The user can visually skim a list of representative images from the scenes that compose the timed media file, thereby utilizing the visual information inherent in the timed media file itself to select an appropriate starting point for viewing the file. Some timed media search systems also use speech recognition to display a portion of any spoken text from a given scene.

The foregoing method is particularly useful in the field of digital video editing and production processes, as a sequential storyboard is often an ideal presentation of the media. Unfortunately, such an approach is not nearly as useful in the context of factual information searching and retrieval. Users of factual information searching systems are often less interested in the visual information, and a great deal of the factual information-centered timed media content created specifically for the Internet contains little such visual information.

Other conventional timed media systems do not divide a timed media file into segments. Such systems index the precise time at which a particular term is spoken. A user can then search for a particular term and use the search results to begin replaying the timed media file from the precise occurrence of the search term. While this method guarantees that a user can locate the occurrence of the search term, the user still must manually determine how much of the timed media file, before and after the occurrence of the search term, is relevant. Consequently, determining the extent to which the timed media file or particular portions of the timed media file are relevant still requires a significant amount of manual navigation and review of irrelevant content.

A further problem exists because of the rigid nature of the aforementioned systems. An important technique for solving the problem of creating a useful timed media search index is to make assumptions about the timed media based upon its origin or intended use. For example, timed media presentations from different industries should use different speech recognition lexicons, and a multi-speaker video conference might be segmented using different processes than a single-speaker speech. The aforementioned systems are fairly limited solutions in that they do not allow the user to customize the processes involved in creating or using a search index. As a result, such systems do not even optimally use their own technologies for indexing particular types of timed media.

BRIEF SUMMARY OF THE INVENTION

Presently, no timed media indexing system exists that is tailored to the needs of general media distribution. While digital video search tools exist that have been designed for television and video editing and production, such video search tools are designed to manage and index content according to visual and editorial cues and manually entered meta-data. These tools cannot manage the timed media files according to information presented in the files or according to the intended use of the documents. As a result, such tools are ill suited to the needs of the general audience of the media.

As the nascent Internet emerges to become a more mature medium for communication, the content of the Internet is shifting from static, text-based documents to include a rapidly increasing number of interactive, timed media files. To date, the greatest limitations on the use of timed media files have been insufficient broadband capacity and immature compression technology. Already, these hurdles are being surmounted and timed media is gaining prominence in a number of diverse fields, such as entertainment, e-learning, financial analysis, knowledge management, business communication, the legal industry, and medicine, indeed almost any industry that disseminates information.

Presently, timed media is typically distributed through timed media content providers. Timed media content providers require tools that can effectively index, search, and retrieve information stored in timed media documents. These tools must be capable of cataloguing, organizing, and accessing the potentially overwhelming glut of timed media being provided via the Internet. More specifically, given the length of many timed media files, a tool is needed that can immediately provide access to relevant segments within a longer timed media file.

While timed media content providers are presently the primary users of timed media, the use of timed media is increasing in specialized applications such as e-learning and knowledge management. The e-learning industry has been an early adopter of timed media technology due to the need to communicate information to users through a variety of mediums. The ability to both provide a new use for the e-learning timed media files outside their original e-learning environment and customize e-learning sessions is desirable. Current e-learning search tools are oriented toward retrieving general educational topics rather than the information contained within the media, and thus are incapable of accommodating new purposes for the timed media information.

While not an early adopter, the knowledge management industry is rapidly moving to incorporate timed media collaboration capabilities into its products. As a result of the increasing volume of timed media files within organizations' knowledge bases, these organizations will require a system capable of effectively managing the information contained in timed media files. Currently, this need remains unmet.

Another entirely unmet need is that for personalized and filtered content. As the ease of content creation has grown, so has the amount of content available. A major financial institution can, for example, create dozens of hours of content per day of stock market analysis, industry news, and corporate earnings calls and reports. Creating daily, personalized broadcasts to brokers, investors, and analysts of just the portions of this barrage of content that applies to the interests of each individual suddenly makes this stream of information incredibly useful. Today this filtration would have to be done by human editors or meta-taggers, a method that is impossible to scale and to fine-tune for each individual.

The above-noted deficiencies and other deficiencies of the prior art are addressed by the present invention, which is directed to a method and system for searching and retrieving information from timed media files based upon relevance intervals. The method and system for searching and retrieving this information is based upon relevance intervals so that it returns a portion of a timed media file that is selected for specific relevance to the given information representations, thereby eliminating both the need for a manual determination of the relevance and the problem of missed relevant portions. The timed media includes streaming audio, streaming video, timed HTML, animations such as vector-based graphics, slide shows, other timed media, and combinations thereof.

An object of the present invention is to provide a system and method for searching and retrieving timed media files that allows the user to locate relevant documents and the relevant portions of those documents.

Another object of the present invention is to provide a system and method for searching and retrieving timed media files that returns relevance intervals, which are not individual documents, but rather portions of timed media files.

Yet another object of the present invention is to provide a system and method for searching and retrieving timed media files that is customizable by the user. A user can customize returned results as well as each portion of the system that performs a calculation.

Still another object of the present invention is to provide a system and method for searching and retrieving timed media files that returns a portion of a timed media file that is selected to be specifically relevant to the given information representations, thereby eliminating the need for manual determination of relevance.

Another object of the present invention is to provide a system and method for searching and retrieving timed media files in which a raw data index is developed from timed media files.

Yet another object of the present invention is to provide a system and method for searching and retrieving timed media files in which the raw data index includes information such as an information representation and the time-codes of the interval during which that information representation occurs in the file.

Still another object of the present invention is to provide a system and method for searching and retrieving timed media files that returns relevance intervals and associated relevance magnitudes for each query.

Another object of the present invention is to provide a system and method for searching and retrieving timed media files that creates segments that are customized for each query.

Yet another object of the present invention is to provide a system and method for searching and retrieving timed media files that, while returning relevance intervals, allows the user to navigate through the document as a whole as well as within the intervals.

Still another object of the present invention is to provide a system and method for searching and retrieving timed media files that, prior to receiving a query from a user, evaluates data extracted from timed media files to determine relevance intervals for information representations in the timed media files.

Another object of the present invention is to provide a system and method for searching and retrieving timed media files that evaluates data extracted from timed media files to determine relevance intervals applicable to a complex query involving multiple query information representations.

Yet another object of the present invention is to provide a system and method for searching and retrieving timed media files that retrieves contextual information so that each relevance interval constitutes a minimal self-contained unit.

Still another object of the present invention is to provide a system and method for searching and retrieving timed media files that returns transcripts for all returned timed media segments.

Another object of the present invention is to provide a system and method for searching and retrieving timed media files that returns relevance intervals using information representations based on user queries and material related, directly and via ontologies, to such entries.

Yet another object of the present invention is to provide a system and method for searching and retrieving timed media files that enables automatic personalization of content according to a user's preferences.

Still another object of the present invention is to provide a system and method for searching and retrieving timed media files that enables the automatic summarization of timed media.

Still another object of the present invention is to provide a system and method for searching and retrieving timed media files that, after returning relevance intervals in a virtual document, allows the user to save, manipulate, and share the results.

BRIEF DESCRIPTION OF THE SEVERAL VIEWS OF THE DRAWINGS

These and other attributes of the present invention will be described with respect to the following drawings in which:

FIG. 6 is a search display screen presented to a user when utilizing the present invention;

FIG. 7 is a results display screen presented to a user subsequent to a search request according to the present invention;

FIG. 10 is an example centrality scoring for a sample sentence using the centrality calculation module according to the present invention;

DETAILED DESCRIPTION OF THE INVENTION

Overview

Figure 1:
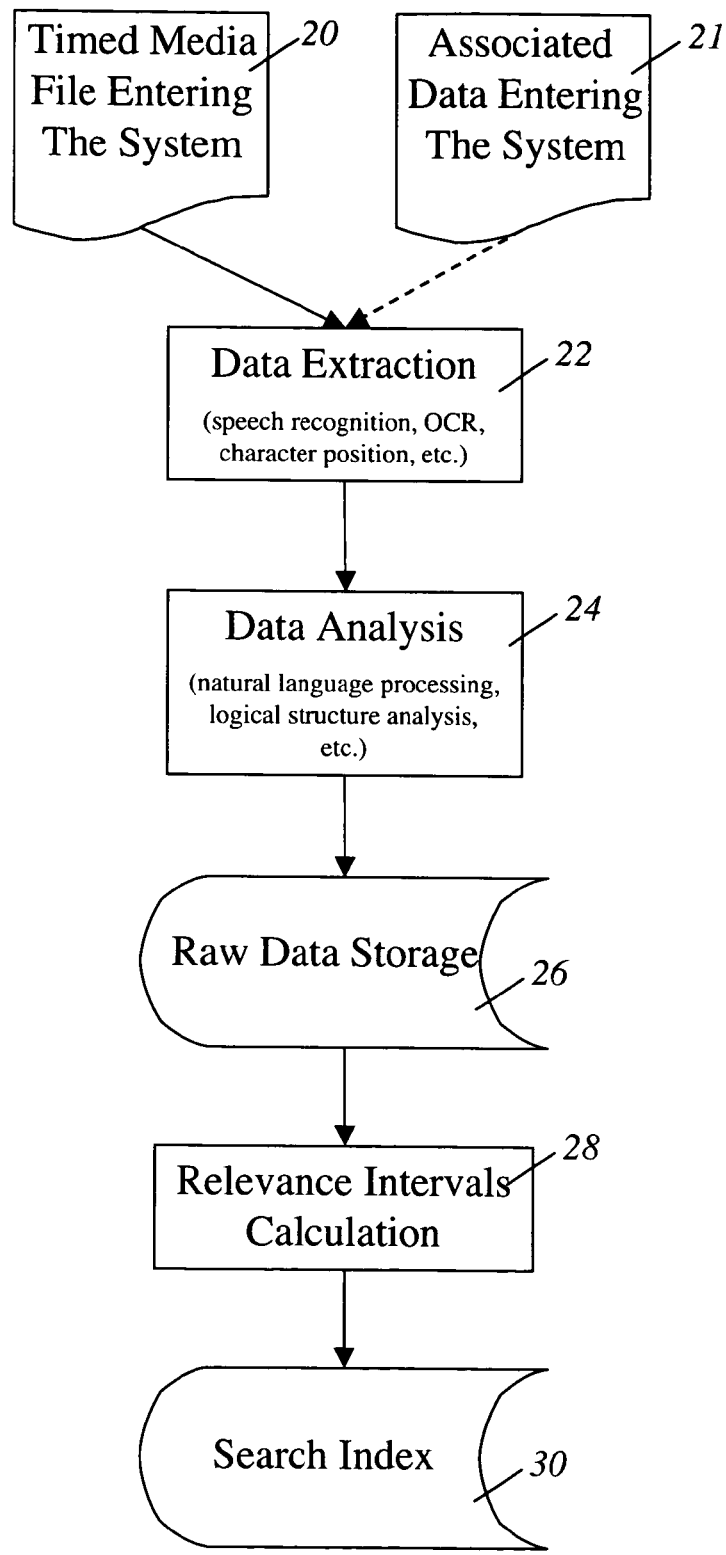
FIG. 1 is a flow chart showing an overview of the timed media indexing method according to the present invention.

Referring to FIG. 1, the timed media indexing system and method for searching and retrieving timed media according to the present invention is illustrated. A timed media file is entered into the system in step 20. In step 21, data associated with the timed media file may be entered into the system. This data can include meta-data, such as the title or subject of the timed media file; descriptive information; categorization of the media file according to genre (e.g. news, presentation, instructional content), number of speakers, or expected use; text on subject matter closely related to the timed media file; HTML from a Web page that is associated with or that includes the timed media file; and other types of data. In step 22, the system then extracts data from the timed media file and the associated data. The extracted data can include spoken words, speech and sound events or parameters, on-screen text, meta-tag information, and other types of data. The extracted data is then analyzed in step 24 using natural language processing, conceptual reasoning, logical structure analysis, and other techniques. The results of the analysis are saved in a raw data index in step 26, so that users can access the raw data for highly accurate multi-information representation queries and for the creation of customized or updated search indices at a later date. In some embodiments of the current invention, step 26 may not be necessary, as in the case where only the need for rapid results is anticipated and it is not intended to customize the search index or update the relevance interval calculation at a later date. In step 28, relevance intervals and their associated magnitudes of relevance are calculated for each information representation, and the relevance intervals and the corresponding magnitudes of relevance are stored in the search index in step 30, along with other calculated data that can be used to adjust the intervals for a given user or calculate relevance intervals for complex queries.

The term relevance interval as used herein means a continuous section of a timed media file, e.g. video or audio, that is deemed relevant to a particular information representation. The relevance intervals are calculated using mathematical formulae that, depending upon the type and other characteristics of the media, take into account the clustering of the occurrences of information representations; a set minimum length; the natural breaks in the media, such as paragraphs, changes in slides, verbal pauses, or speaker changes; natural language processing data, such as parts of speech, grammatical structure, multi-word concepts, named entities, and references; semantic information, such as synonyms, classifications, similarities, concepts related by knowledge-based connections, and topic similarity; logical structure based upon transition words, prosodic cues, visual layout, surrounding HTML, topic flow, and statistically measured continuity of topic; and other extracted data. The set minimum length is often needed since a three second clip, for example, would rarely be of any use within most media files.

The term information representation, as used herein, denotes an indicator of material relevant to a concept, search term, or more complex query. An information representation, therefore, can comprise any single item or combination of particular definitions of particular words, parts of speech, words, phrases, sentences, grammatical structures, and linguistic objects. An information representation need not be a complete sentence. It is expected that an information representation would not be a single article, preposition or conjunction since such parts of speech, absent a connection to other parts of speech, do not convey meaning. For example, the word "the" is one of the most commonly occurring words in the English language. A search for "the" alone would yield meaningless results. On the other hand, an information representation such as in the spoken phrase "the Great Depression" uses the article "the" in connection with the adjective "great" and the noun "depression," forming a concept that is distinct from any combination of one or two of its three words. Such an information representation would be much more likely to provide useful relevance intervals. Similarly, the co-occurrence of the phrase "the depression" with the phrase "the nineteen thirties" is likely to be an information representation with the same meaning, even though these phrases may be separated by other words and independently they can have other meanings. In the context of search and retrieval, query information representations comprise indicators of that which is sought in a query, and information representations within texts and timed media files indicate the presence of that which is relevant to the search and should be returned.

Figure 2:
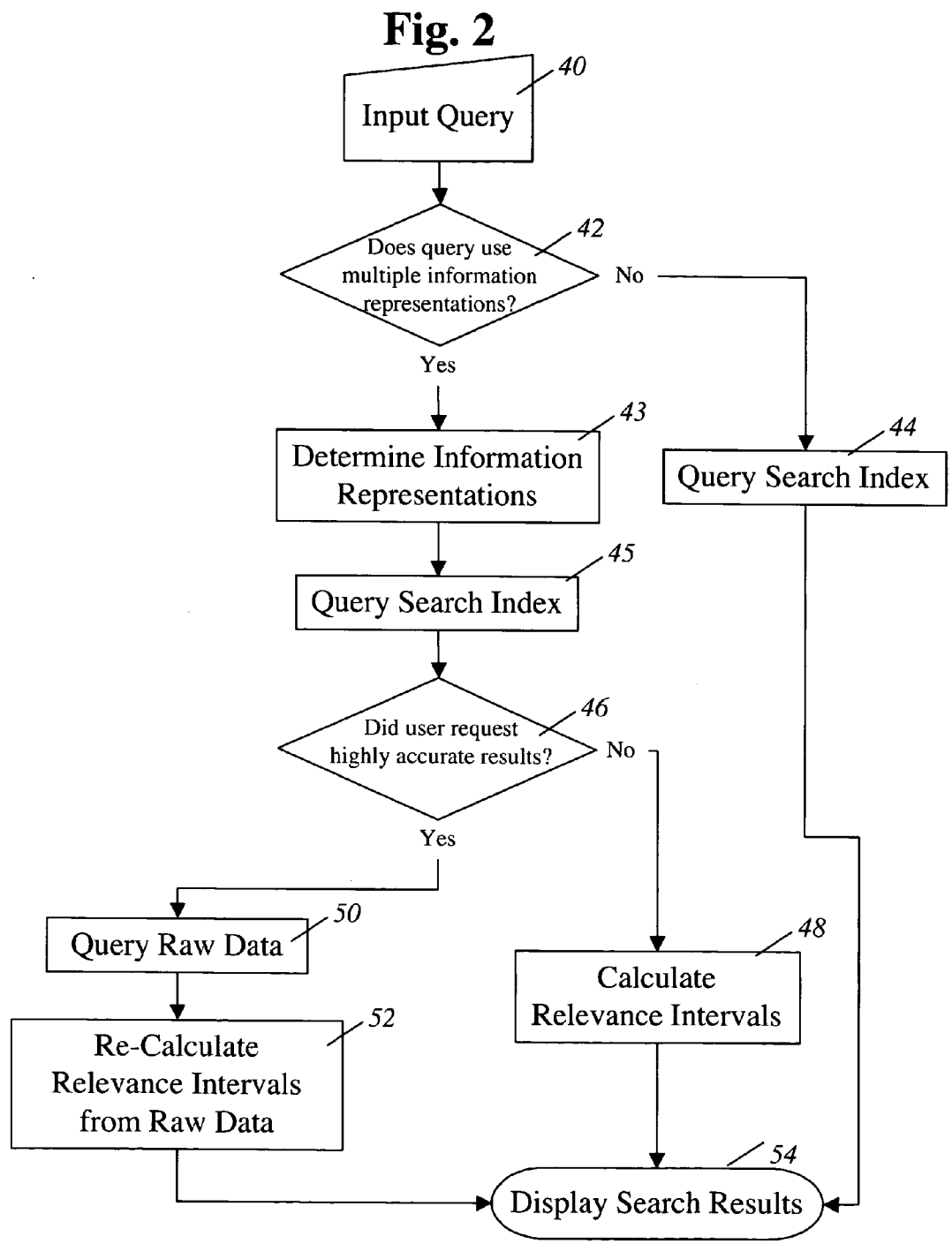
FIG. 2 is a flow chart showing an overview of the process of creating and returning search results to a user according to the present invention.

FIG. 2 is a flow chart showing an overview of the process of creating and returning search results to a user. In step 40, the user inputs a search query. In step 42, a determination is made as to whether the query includes more than one information representation. If the search included only one information representation, then the search index is queried for the relevance intervals associated with the single information representation in step 44, and the process proceeds to step 54 where the search results are displayed to the user.

If, on the other hand, the search used multiple information representations, then the process proceeds to step 43 where the query is divided into its multiple information representations, and subsequently to step 45 where the search index is queried for the relevance intervals associated with each of the information representations. Following this query, in step 46 a determination is made as to whether the user requested a search of sufficient accuracy to warrant calculations using the raw data. Note that this request for a high degree of accuracy is not necessarily explicit; it may be implicit in the content indexed, the way in which the user is interacting with the system (e.g. receiving a personalized broadcast vs. entering a search), or via a decision on the part of the content providers. If the user did not request sufficiently accurate search results, the system then calculates intervals appropriate for the combination of information representations in step 48, and then displays the search results in step 54. The calculations of step 48 can be performed quickly using only the information stored in the search index for each individual information representation. If, however, the user requested sufficiently accurate search results, the system then performs a more time consuming process of querying the raw data in step 50, calculating more precise multi-information representation relevance intervals from the saved raw data in step 52, and then displaying the results to the user in step 54.

Step 54 of displaying the results to the user may, in some instances, be unnecessary. For instance, in a corporate training context, existing timed media files may be used to locate content that relates to a certain topic, e.g., employment discrimination. The results, namely the virtual documents that are relevant to the query and the relevance intervals they comprise, may be stored, but not displayed. These results might be used, for example, at a later date to automatically create a training program relating to employment discrimination.

Figure 3:
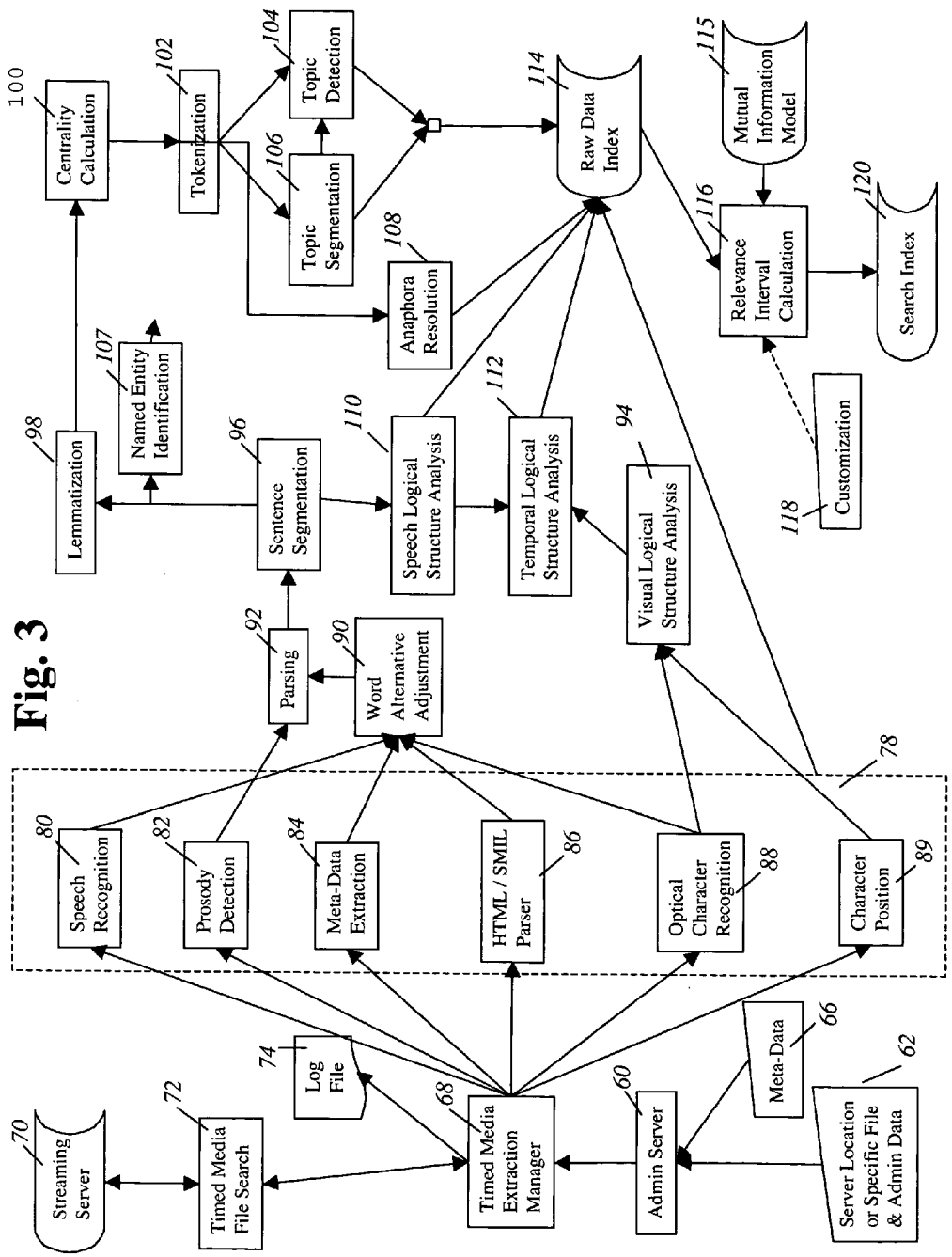
FIG. 3 is a process chart showing the process of creating a search index and raw data index of media files according to the present invention.

FIG. 3 is a process chart that sets forth the process of creating a search index and raw data index for a timed media file that does not have a speech transcript. The process chart illustrates the system modules, inputs, and outputs, as opposed to the flow chart steps shown in FIG. 1. An administrator can direct the system to a given timed media file or a server containing timed media files, as depicted in block 62, by entering the location of the file or server into the admin server, block 60. In the latter case, the system can detect new timed media files automatically via the timed media file search block 72. Similarly, the administrator can enter administration data, as depicted in block 62, including various parameters of the file(s) to be indexed, playback locations, index file locations, subject parameters, etc. When the timed media file search block 72 is directed to a timed media file that is new to the system, the timed media file search block 72 informs the timed media extraction manager 68, which in turn directs information extraction modules 78 to run on the timed media file. The timed media extraction manager 68 automatically detects characteristics of the media (e.g. audio-only vs. audio and video) and uses this information along with any administration data to determine which of the information extraction modules 78 are applicable to the media file. In addition, an administrator may enter meta-data, such as the title, speakers, subjects, etc., of the timed media file as depicted in block 66. A log of activity conducted by the timed media extraction manager 68 is kept in the log file, block 74 and can be viewed via the admin server 60.

The information extraction modules 78 include speech recognition module 80, prosody detection module 82, meta-data extraction module 84, HTML/SMIL parser 86, optical character recognition module 88, and character position module 89. Several of the information extraction modules 78 are integrated versions of third-party software that are customized to retain the time-code and other information, as discussed below. Extracted data from the information extraction modules 78 is passed to an analysis engine. In particular, the data extracted by the speech recognition module 80, meta-data extraction module 84, HTML/SMIL parser 86, and optical character recognition module 88 is passed to the word alternative adjustment module 90, the data extracted by the prosody detection module 82 is passed to the parsing module 92, and the character position module 89 and optical character recognition module 88 send data to the visual logical structure analysis module 94.

The word alternative adjuster module 90 adjusts the confidence probabilities determined by the speech recognition module 80 by comparing the speech recognition output with output from the data extracted by the meta-data extraction module 84, HTML/SMIL parser 86, and optical character recognition module 88, as well as with the entered meta-data 66. The output of the word alternative adjustment module 90 and the prosody detection module 82 are used by the parsing module 92 to determine the grammatical structure of language contained within and associated with the timed media file. This language is then divided into sentences by the sentence segmentation module 96.

Output of the sentence segmentation module 96 is used to stem the words contained in and associated with the timed media file by the lemmatization module 98. The relevance of each information representation identified by the extraction modules to the content surrounding each said information representation is then calculated by the centrality calculation module 100. The language is then tokenized by the tokenization module 102, after which the system calculates topic boundaries via the topic segmentation module 106 and determines the major topics via the topic detection module 104.

In addition, the output of the sentence segmentation module 96 is used by the named entity identification module 107 to identify proper nouns and determine which proper nouns within a media file refer to the same entity. The name co-references determined by module 107 are used, along with the output of the centrality calculation module 100, to resolve direct and indirect anaphora (including pronouns, definite references such as "the company," and indirect references such as "the door" following a discussion of a house) in module 108.

Also, the output of the sentence segmentation module 96 is used to analyze the logical structure of text that is spoken within the timed media file via the speech logical structure analysis module 110. The output of this analysis is combined with the output of the visual logical structure analysis module 94 via the temporal logical structure analysis 112.

The outputs from the information extraction modules 78, as well as from all of the information analysis modules 90 through 112, are saved in the raw data index 114. The raw data stored in the database 114 is utilized to calculate relevance intervals in block 116. The relevance interval calculation module 116 also uses information from the mutual information module 115 in its calculations. The relevance interval calculations in block 116 can be customized as noted by customization block 118. The resulting relevance intervals are then stored as search index 120.

Figure 4:
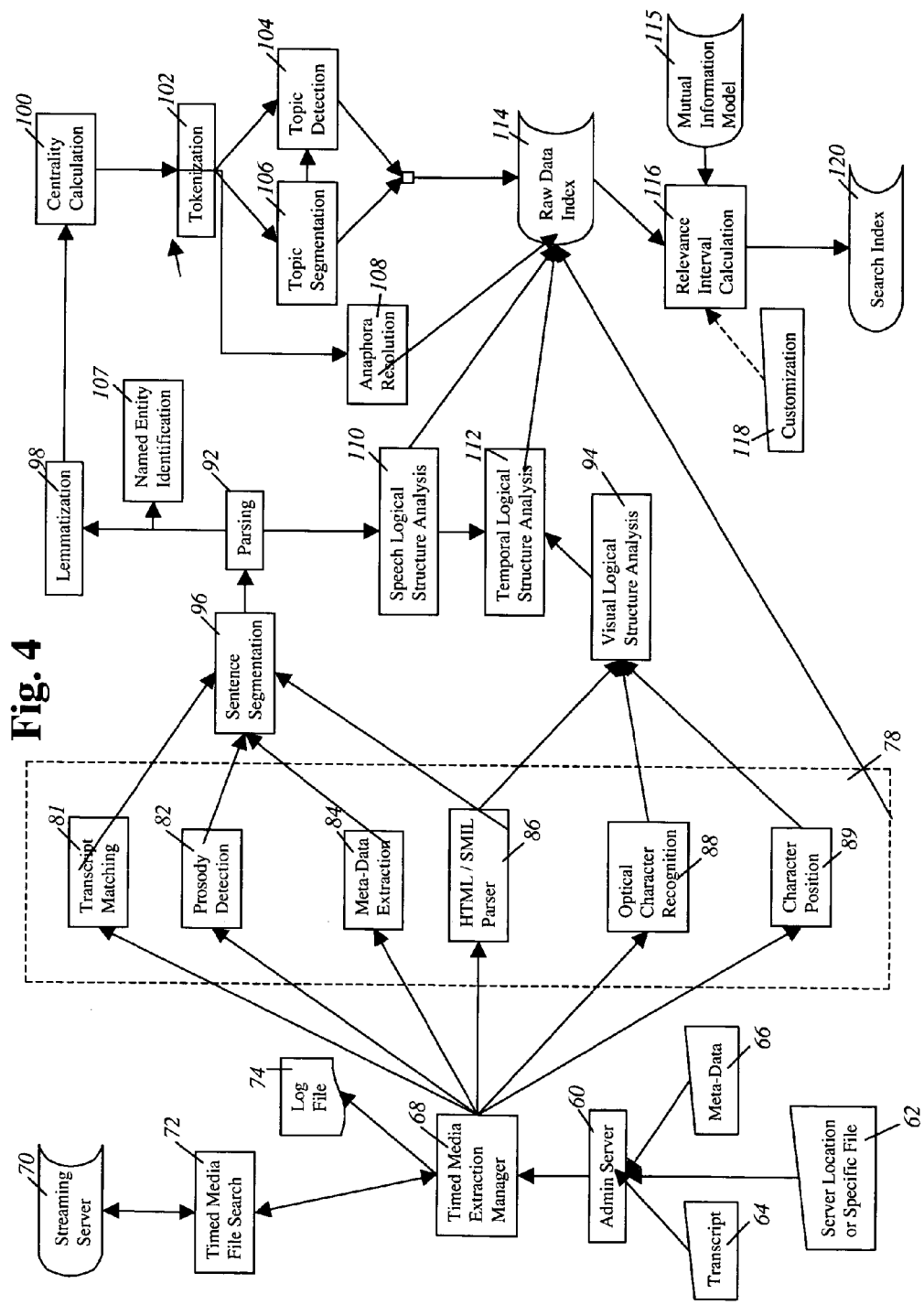
FIG. 4 is a process chart showing the process of creating a search index and raw data index of media files with accompanying transcript or closed-captioning files according to the present invention.

FIG. 4 is a process chart that sets forth the process of creating a search index and raw data index for a timed media file that is accompanied by the text of the speech contained within the timed media file, as in a manually created transcript or closed caption text. In addition to the inputs depicted in FIG. 3, an administrator enters the speech transcript into the system, as depicted in block 64. As in FIG. 3, the timed media extraction manager 68 coordinates the extraction of information from the timed media file via the information extraction modules 78, after which the analysis modules 90 through 112 analyze the extracted information. In this case, however, the output from the speech recognition module 80 is replaced with a transcript matching module 81 that synchronizes the text transcript with the timed media file. The synchronized transcript is then divided into sentences via the sentence segmentation module 96 and grammatically parsed by the parsing module 92. In this scenario, the output from the prosody detection module 82, the meta-data extraction module 84, and the HTML/SMIL parser module 86 is passed directly to the sentence segmentation module 96. The remainder of the process follows the process outlined in FIG. 3 above.

Figure 5:
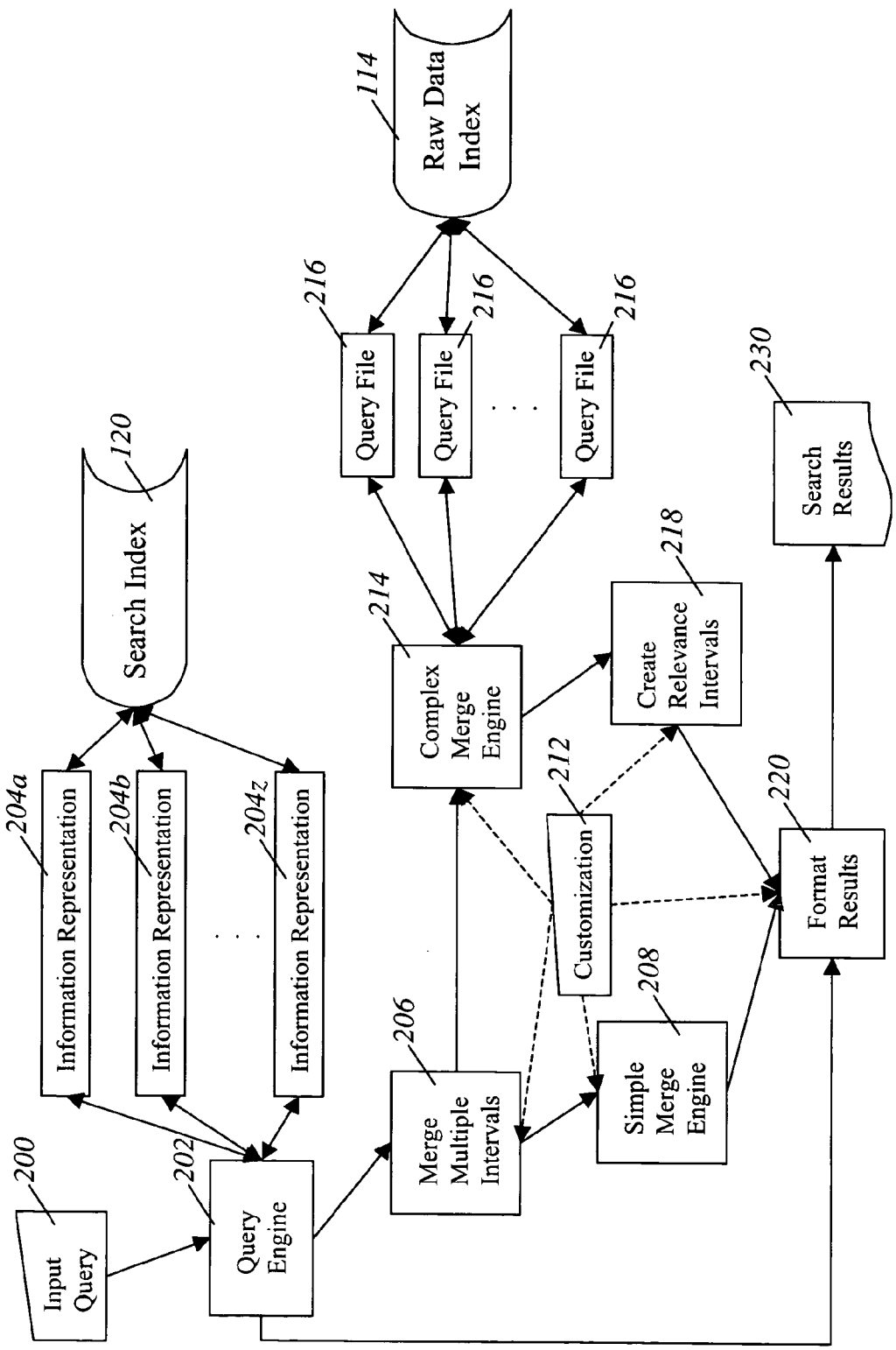
FIG. 5 is a process chart showing the operation of the system of the present invention in response to a user-entered query.

Referring to FIG. 5, a process chart showing the operation of the system in response to a user-entered query is illustrated. When an input query 200 is received by the query engine 202, the query engine 202 parses the query 200 into discreet query information representations and directs query processes for each query information representation 204*a*, 204*b* . . . 204*z*. Each of the query processes reviews the search index 120 and returns the results most relevant to each information representation 204 in the form of relevance intervals 205. If the input query 200 consists of only a single information representation, then the results are formatted in module 220 and displayed to the user in search results 230.

If the input query 200 consists of multiple information representations 204, the query engine 202 passes the user inputs to module 206, which determines the method by which the system will calculate relevance intervals for the multiple information representations. If a quick search is appropriate, the module 206 sends the results to simple merge engine 208 that performs the calculations necessary to combine the relevance intervals from the search index 120 into formatted results that are relevant to the plurality of information representations 204. The combined results are then formatted in module 220, and displayed to the user as search results 230. The methods by which the multiple intervals are merged, as well as the individual calculations themselves, are customizable by the end user and/or the administrator, as denoted by module 212.

If the merge multiple intervals module 206 has determined that a highly accurate search is necessary, the merge multiple intervals module 206 instructs the complex merge engine 214 to query the raw data index 114 for the files 216 that contain detailed information concerning the relevance intervals for each of the information representations 204. Module 206 forwards the results from the query engine 202 to the complex merge engine 214. Module 218 utilizes the results from module 202, the decisions made by module 206, and the raw data collected by the complex merge engine 214 to perform the complex merge of the relevance intervals from files 216, thereby creating relevance intervals that are relevant to the plurality of information representations 204, and the relevance magnitudes for those relevance intervals. The manner in which the complex merge engine 214 and the relevance interval creation module 218 operate is customizable through customization module 212. Once again, the results are then formatted in module 220, and displayed to the user in search results 230.

FIG. 6 shows a screen 240 that is presented to a user to perform a search using the system of the present invention. The screen 240 includes a query input space 242, which in FIG. 6 contains the input query "science legislation Shelby amendment HR88." Below the input query space 242 are boxes 244 and 246 through which the user designates the type of timed media files to be searched, i.e. audio files and/or video files, respectively. Next the user can designate how the results are returned, either entire documents only or including partial documents, by marking box 248. The user can further elect a general topic search, via box 250 or a specific information search via box 252. Finally, the user selects the degree of accuracy by choosing the time for the search via boxes 254. The more time selected, the more accurate the search.

The results may be displayed in a screen 308 as shown in FIG. 7. The results can be sorted by document or by date. In the example shown in FIG. 7, the search returned 15 results, of which two are shown in the window. Each result includes a relevance magnitude, information describing the timed media file, sample text from the relevant portion of the file, the time intervals of the relevance intervals, and the date. For each result, a box 310 is provided that allows the user to combine that result with others that are checked into one large file for playback. The playback of the combined results is achieved by accessing the "play checked" box 320. Alternately, the user can select any individual interval listed in the time interval section 330 or the full document. Instead of playing the timed media file, the user can access a text transcript of the timed media file or a full summary 334, both of which are automatically created by the system. The results display screen 308 also allows the user to manipulate the results by clicking on the "find similar" indicator 340 to sort the results so that results similar to the selected result are displayed.

Figure 8:
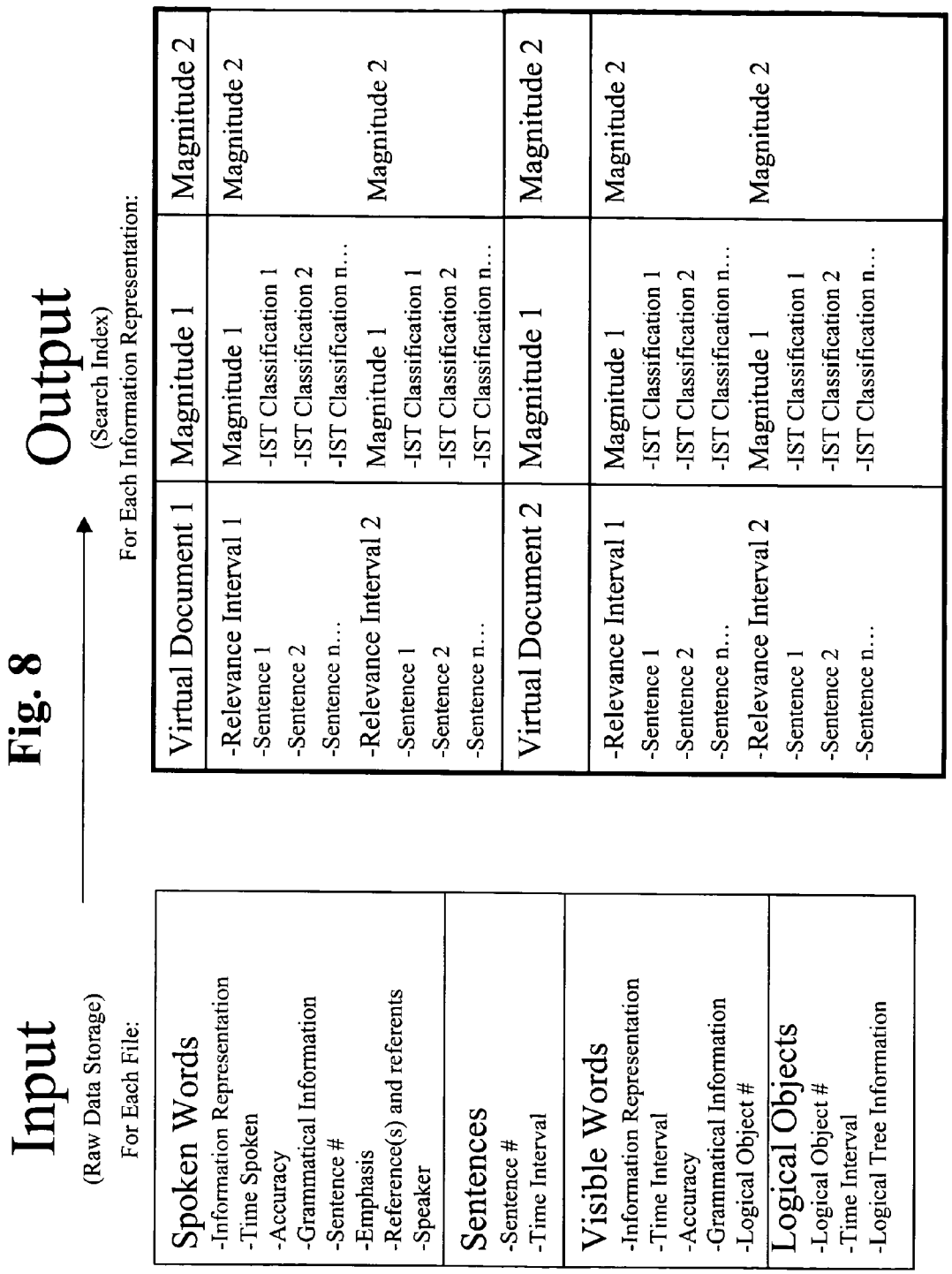
FIG. 8 is an input/output chart showing the inputs and outputs for the calculation of the relevance intervals according to the present invention.

Referring to FIG. 8, sample inputs and outputs of the relevance interval calculations of the system of the present invention are described. The Input column on the left represents the raw data index 114 inputted to the relevance interval calculations, and the Output column on the right represents the search index 120 produced as described previously with regard to FIG. 3 and FIG. 4. The input is the raw data index that includes data generated by some or all of the data extraction and analysis modules 80-112. The raw data includes each information representation that is located within the timed media file, the time-code location of the occurrence of each information representation, groupings of such information representations (either sentences or visual objects), and logical or grammatical relationships between information representations and information representation groupings.

For spoken information representations, the raw data index 114 includes data such as the time-code at which the information representation occurs in the file, the accuracy representing the certainty by the speech recognition system of its correct identification of the information representation(s), grammatical information such as the part of speech of the information representation or types of clauses of which the information representation is a part, the sentence number, the emphasis and other information about how the word was spoken, references and referents such as the information representation to which a pronoun refers, synonyms, adjectives and other modifiers, etc., or the person who spoke the information representation.

For sentences, the raw data index 114 includes data such as the sentence number and the time-code at which the sentence occurs in the file.

For visible information representations, the raw data index 114 includes data such as the information representation, the time-code at which the information representation is visible, the accuracy representing the certainty by the optical character recognition system of its correct identification of the information representation(s), grammatical data such as the part of speech of the information representation or types of clauses of which the information representation is a part, and the logical object number.

For visual logical object information representations, which are the output of visual logical structure analysis module 94 that parses outlines, headlines, etc. from PowerPoint® slides or typed overhead projections, the raw data index 114 includes data such as the logical object number, the time-code at which the information representation occurs in the file, and the logical tree information.

The output of the relevance interval calculations, contained in the search index 120, includes a list of potential search results which are a collection of relevance intervals that are streamed back-to-back and indexed as a single virtual document. The entry for each information representation contains a list of the relevance intervals that make up the virtual document. For each relevance interval there are one or more relevance magnitudes listed that provide a measured weight to the relevance of the virtual document or relevance interval. A relevance magnitude is a measure of the degree to which the relevance interval is relevant to the information representation. Multiple magnitudes correspond to different search contexts or user situations. For each sentence within each relevance interval, there is an interval sentence type classification, or IST classification, that indicates at which stage in the relevance interval calculation that sentence was included in the relevance interval.

The term virtual document, as it is used herein, means a group of one or more relevance intervals that are indexed, searched for, and played back as if they were a whole timed media file. In reality, virtual documents exist only as pointers to the time-code of a timed media file. In the preferred embodiment of the present invention, the relevance intervals that make up a virtual document are almost always from the same timed media file.

Figure 9:
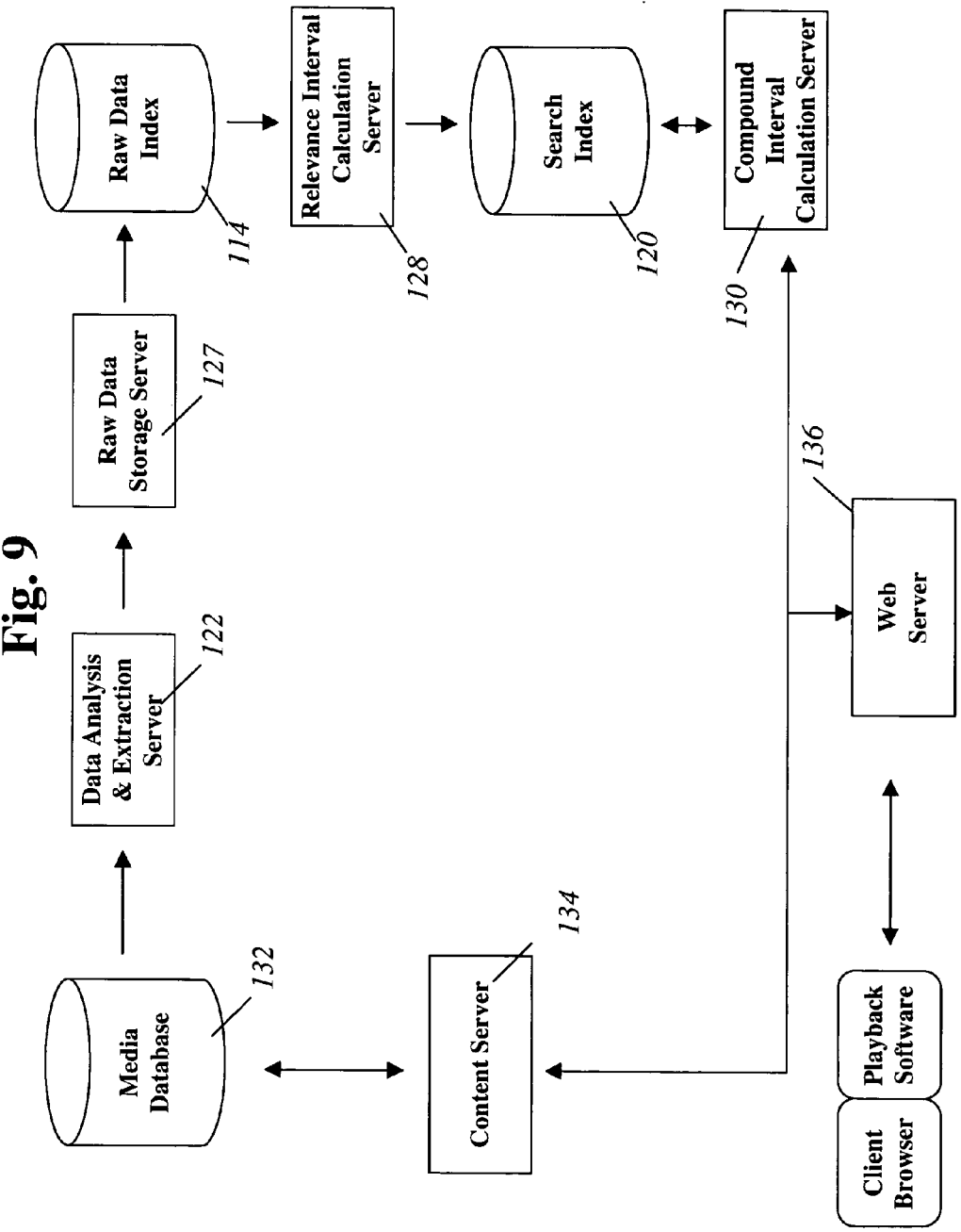
FIG. 9 is an architecture diagram illustrating the software implementation architecture of the present invention.

Referring to FIG. 9, a software implementation architecture for the invention is illustrated. As discussed in brief previously, the present invention creates two databases of information derived from the timed media files: a raw data index 114, and a search index 120. The first major step in the indexing process is the generation of the raw data index 114. The generation of the raw data index 114 is accomplished through the integration of data extraction and processing modules, such as speech recognition software, natural language processing software, and optical character recognition software (as outlined previously in FIG. 3 and FIG. 4).

The digital content of a given timed media file is saved in media database block 132. These saved timed media files are then entered into the data analysis and extraction server 122. All of the data generated by the analyses are saved by the raw data storage server 127 into the raw data index 114. The relevance interval calculation server 128 uses the data saved in the raw data index 114 to create virtual documents for each identified information representation, the relevance magnitudes for these virtual documents and the intervals they contain, and other information required for merging virtual documents. The relevance interval calculation server 128 saves all of this information in the search index 120.

When a user requests media via the system, a Web server 136 passes the request to the compound interval calculation server 130 which extracts the relevant virtual documents from the search index 120; for multi-information representation requests the compound interval calculation server 130 combines virtual documents. Once the search results are determined they are displayed to the user by the Web server 136. If the user, via a link, decides to play any of the search results, the Web server plays the search results to the user by grabbing the specified portions of media files from the content server 134.

The system of the present invention consists of three basic components: an indexing component, a searching component, and a playback component.

Indexing

In the preferred embodiment of the present invention, an administration server coordinates the various steps in the indexing component. This server allows users to specify timed media files to be processed or monitors servers for the presence of new content to be automatically processed. It then coordinates the individual indexing modules so that they share data and where possible can run in parallel. This also allows indexing to be parallelized across multiple computers.

Data Extraction

In factual information-based timed media files, most of the information is contained in the spoken information representations of the presenters or discussion participants. Referring to FIG. 3, a speech recognition system 80 captures such information representations and records the time at which each information representation is spoken. Because of the probabilistic nature of speech recognition, the speech recognition system 80 also records alternatives for words or phrases, each alternative having a corresponding probability. In addition, the speech recognition system 80 records other aspects of the speech, including pauses and speaker changes. Unlike speech recognition for real-time transcription or desktop dictation, speech recognition in this system can have a much higher degree of accuracy on untrained speakers due to the fact that the speech recognition function does not have to be performed in real-time and can utilize greater processing power. Further characteristics of the speech are extracted by the prosody detection module 82. This module identifies prosodic cues such as inflections and pitch that can indicate emphasis, relations, or phrase, sentences, and topic boundaries.

Information representations are also extracted from visual information associated with media files via optical character recognition (OCR) in block 88, HTML/SMIL parsing in block 86, and character position recognition in block 89. These modules record text that is visible as the viewer plays the media, and note characteristics of this text such as the size, position, style, and precise time interval of visibility. In addition, the meta-data extraction module 84 extracts meta-data that has been embedded in the media file. This can be as simple as the name of the file or can be a much more involved set of meta-data, such as MPEG-7 meta-tags.

In the case that a transcript of the media is available (as shown in FIG. 4), the system performs transcript matching in block 81 rather than speech recognition. This faster and much more accurate procedure determines the precise time at which each word in the transcript is spoken.

Post-Processing

Referring to FIG. 3, once this data has been extracted, it can be post-processed by the word alternative adjustment module 90 to increase the accuracy of the speech recognition data. This process relies upon the fact that the extraction of text via OCR, HTML/SMIL parsing, and meta-data extraction (collectively referred to as the text recognition modules) is far more accurate than speech recognition. Thus, the probabilities associated with each word or phrase alternative by the speech recognition module 80 can be adjusted by comparing the alternatives with OCR, HTML/SMIL, and meta-data text. Words and phrases that have been extracted via the text recognition modules have an increased likelihood of being spoken within the media, and thus their probability can be raised accordingly. This adjustment can be exaggerated during the time intervals in which the words and phrases are visible to the viewer, as such intervals are the most likely time at which they will be spoken.

This post-processing step is entirely unnecessary in the scenario in which a transcript has been provided, as in that case the discrepancy in accuracy between speech and text recognition does not exist.

Parsing & Sentence Segmentation

Referring to FIG. 3, the output of the word alternative adjustment module 90 and the prosody detection module 82 are analyzed by the parsing module 92 to determine grammatical information, including parts of speech, phrases, verb argument structure, clausal dependencies, and other features. This parsed text and prosodic information are separated into sentences via the sentence segmentation module 96. Trained via automated methods such as genetic algorithms and decision-tree training, the sentence segmentation module 96 comprises a set of rules and formulae for determining the most likely sentence boundaries based upon word sequences, pauses, parts of speech, grammatical data, and numerous types of prosodic cues.

Referring to FIG. 4, when a transcript has been provided, sentence segmentation 96 is performed before parsing 92. This is due to the fact that punctuation and capitalization provided within the transcript and within the output of the HTML/SMIL parser 86 are much more reliable indicators of sentence boundaries than the cues used when no transcript exists. Performing this highly accurate sentence segmentation first also increases the accuracy of the parsing module 92, which can then rely on these sentence boundaries in its processes.

Lemmatization

The lemmatization module 98 reduces words such as nouns, verbs, adjectives, and adverbs to a canonical form. This function allows the system to identify that "mouse" and "mice" are the singular and plural of the same concept, and should thus be treated as occurrences of the same or very related information representations. Using the canonical form of each word in the raw data index 114 and the search index 120 also allows the system to respond to queries with virtual documents constructed for alternative forms of a given word or phrase.

Centrality Calculation

One of challenges in the automated indexing of human language is the determination of which concepts are central topics vs. which concepts are mentioned tangentially or inconsequentially. Often, simple measures such as frequency of occurrence do not give clear or correct indications. Many concepts central to the major topic of a presentation, for example, may be implicit altogether.

The present invention addresses this challenge in a number of ways. One method is the calculation of centrality, or the degree to which a concept is central to the sentence that contains it, as measured quantitatively by examining the grammatical structure of that sentence. The centrality calculation module 100 of the present invention calculates a centrality score for each word in a sentence by examining the structure of the sentence as a whole and the phrases it contains. For example, consider the following passage from a speech made by former presidential candidate Al Gore.

"We are now in a new era. To label this time 'the post-Cold War era' belies its uniqueness and its significance. We are now in a Global Age. Like it or not, we live in an age when our destinies and the destinies of billions of people around the globe are increasingly intertwined."

A simple example of centrality analysis can be seen in the fact that the proper noun "Cold War" is used as an adjective. This indicates that the Cold War may not be the central topic of this portion of the speech. Further evidence includes the fact that "the post-Cold War era" is itself the direct object of the infinitive "to label". Altogether this evidence suggests that the relevance of this information representation probably does not, in the absence of other occurrences or semantic information to the contrary, span beyond the passage quoted.

The centrality calculation module 100 operates in three high-level steps. First, the module identifies phrases such as noun, verb, and prepositional phrases. In some implementations of the present invention, this step will actually be done by the parsing module 92.

In the second step, the centrality calculation module 100 identifies verbs and determines their argument structure. This analysis is conducted based upon lexical information concerning the identified verbs as well as the structure and order of the phrases identified in the first step. This step also deduces any hierarchical structure to the identified phrases. Again, in some implementations this analysis might be in part or in whole conducted by the parsing module 92.

Lastly, the centrality calculation module 100 assigns centrality weights to each word based upon its part of speech, role within a phrase, and the role of the phrase within the sentence. FIG. 10 contains an example centrality scoring of each word in a sample sentence.

Tokenization

The tokenization module 102 filters the text extracted from the media to leave only those words that are by themselves units of semantic meaning. For example, the tokenization module 102 filters out determiners such as "the" and "a" because they do not individually carry semantic information. The term token, as used herein, refers to a meaningful word unit, and excludes words such as conjunctions, articles, and prepositions that have been filtered out by the tokenization module 102.

Mutual Information

To understand the semantic connection between nearby portions of a media file, it is very useful to have a quantitative measurement of the relatedness of concepts. In the present invention, such a measurement is built up from a corpus using the well-known concept of mutual information, where the mutual information of word A and word B is defined by $MI(A,B)=P(A\&B)/[P(A)*P(B)]$, where $P(X)$ is the probability of the occurrence of word X. In the preferred embodiment of the present invention, the mutual information model 115 is built in the following way.

A corpus with a wide variety of topics is selected, such as a representative sample of newspaper articles. This corpus is then run through the parsing module 92, the lemmatization module 98, the centrality calculation module 100, and the tokenization module 102. Because many words can function as different parts of speech, a mutual information score is calculated for each unique lemmatized word and part of speech pair. Thus, table/noun is treated separately from table/verb. For each such word/part of speech pair, a table is created that tabulates a) the number of times that word/part of speech pair occurs in the corpus and b) the number of times each other word/part pair occurs within k tokens of the first pair, where k is set to 25. In other words, this table records the number of times that different pairs co-occur within a window of constant size in the corpus.

From this table, the mutual information can be calculated with the following two assumptions a) because the maximum distance of co-occurrence k is much smaller than the normal length of individual documents in the corpus (when the corpus is segmented into documents such as newspaper articles), the effect of the boundary conditions where the primary pair occurs less than k tokens from either end of the document can be ignored, and b) the effect of more than one occurrence of the same pair within k tokens can also be ignored. With these assumptions, the mutual information can be reduced to $MI(A,B)=(N/2k)[(\#A\&B)/[\#A][\#B]]$, where N is the number of words in the corpus,

A is the number of occurrences of the pair A in the corpus, and

A&B is the number of times the pair A occurs within k tokens of the pair B.

In addition, this formula is further modified to take into account a weighting factor. Because the grammatical structure of sentences can help indicate the likelihood that a word is semantically related to most of the surrounding context, each occurrence of a pair in the corpus is weighted according to its centrality, as determined by the centrality calculation module 100. The mutual information score then becomes Let the "centrality sum" $CS(A)=\Sigma_i(cent(A_i))$, where the sums are over all occurrences within the corpus and $cent(A_i)$ is the centrality of the ith occurrence of A in the corpus, and similarly let $CS(A,B)=\Sigma_i(cent(A_i)*cent(B_i))$ where the sum is over co-occurrences within the corpus. Then, $MI(A,B)=(N/2k)[CS(A,B)]/[CS(A)*CS(B)]$.

One problem with this measurement of mutual information is that it can be greatly skewed for word/part of speech pairs that occur very sparsely within the document. This can be overcome with the following two adjustments to the mutual information calculation.

Let $T_{abs}$ and $T_{rel}$ be constants.

1) If A and B have no co-occurrences, $MI(A,B)=\min[(N/4k)(1/CS(A,B), 1]$.
2) If $CS(A)*CS(B)<(N/2kT_{abs})$ and $CS(A,B)<1/T_{rel}$, then $MI(A,B)=1$.

In the above adjustments, the constants $T_{abs}$ and $T_{rel}$ are used to set the maximum absolute and relative uncertainty in the mutual information score, respectively. In the preferred embodiment of the present invention, $T_{abs}$ is set at 10, meaning that the mutual information scores are within 10 of its true value to a high degree of confidence and $T_{rel}$ is set to 0.2, meaning that the mutual information scores are within 20% of their true value to a high degree of confidence. When these criteria are not met, setting the mutual information to 1 is equivalent to stating that we do not have any knowledge of the correlation between the words beyond random chance.

In the preferred embodiment of the present invention, the mutual information model 115 has been calculated based upon a corpus of text over 80 million words in length. This produces a very large number of mutual information scores.

For efficiency, the mutual information model 115 is a filtered version of the scores calculated via the above process in which mutual information scores that are set to 1 via the above two adjustments are left out of the model. The mutual information model 115 is then stored in a database for rapid access by the relevance interval calculation module 116 and the topic segmentation module 106.

Topic Segmentation

Many types of media contain clear topic changes, such as progressions from one section of a presentation to another or between news stories in a news broadcast. Detecting these boundaries is useful within the present invention, as they provide natural points to start and stop relevance intervals and because in many cases a viewer is most interested in seeing the entire segment between consecutive topic boundaries. In the case of very clear topic change, the boundaries can be reliably detected via sentence comparison methods. The topic segmentation module 106 of the present invention performs such methods according to the steps depicted in FIG. 11.

Figure 11:
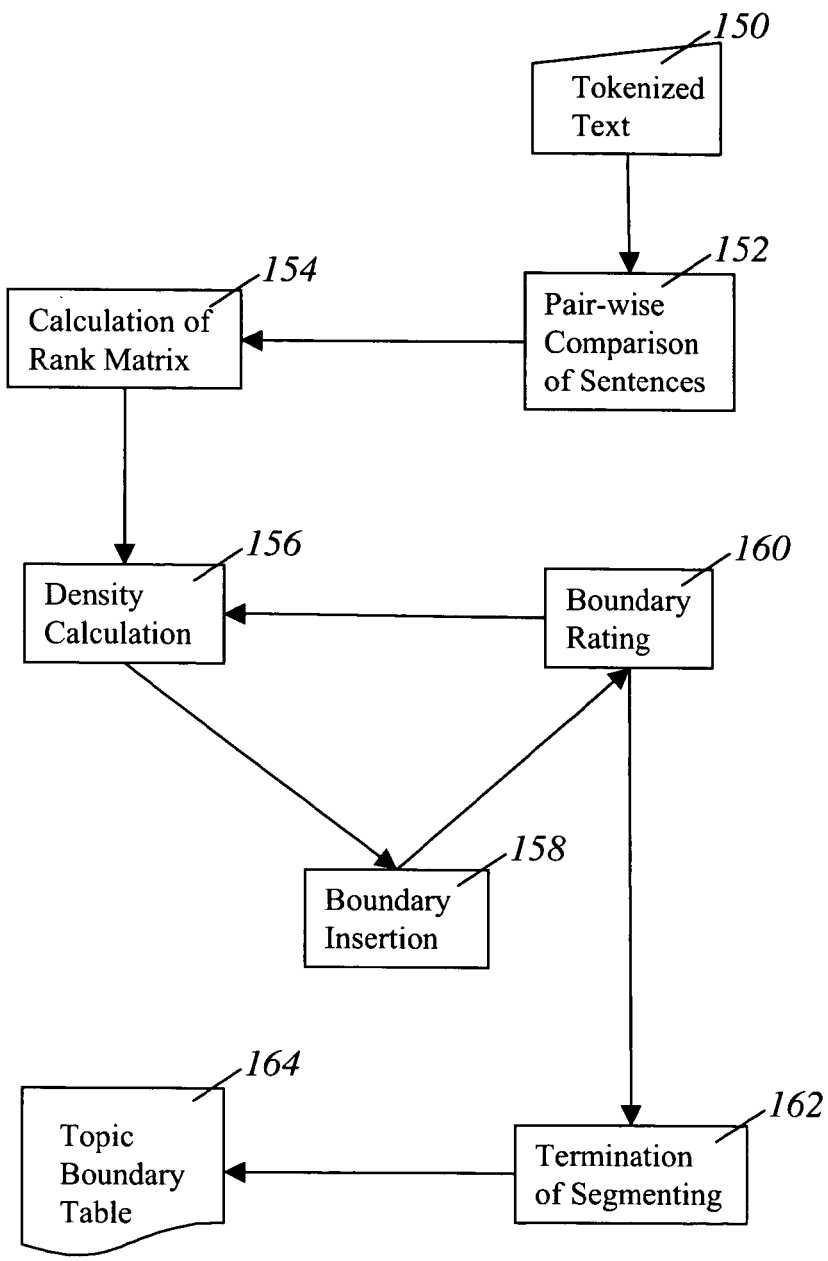
FIG. 11 is a process chart showing the process of topic segmentation using the topic segmentation module according to the present invention.

Referring to FIG. 11, the first step in topic segmentation is the pair-wise comparison of sentences 152 performed on the tokenized text 150 that has been extracted via speech recognition 80. This step creates an n×n matrix of relatedness values for each sentence with each other sentence, where n is the number of sentences within the tokenized text 150. Each of these relatedness values is in turn calculated from an i×j matrix, where i is the number of words in the first sentence and j is the number of words in the second of the two sentences being compared. Note that because the file has been tokenized, i and j are the number of tokens in their respective sentences, which is probably different than the number of words contained within these sentences before tokenization. This i×j matrix contains relatedness values for all pairs of words in which one of the words is contained in the first sentence and the other word is contained in the second sentence. In the preferred embodiment of the present invention, the relatedness value between two words a and b, contained in sentence A and sentence B respectively, is 1 if a and b are the same word (after lemmatization);
(MI−1)/(MI−1+C) otherwise,
where MI is the mutual information between a and b and C is a constant.

In the preferred embodiment of the present invention, a value of C=30 has been found to be most useful.

From the i×j matrix of word-relatedness values, the relatedness value for the pair of sentences being compared is calculated via the following steps. Let $L_1$ be the largest word-pair relatedness value in the i×j matrix of word-relatedness values. Similarly, let $L_2$ be the largest word-pair relatedness value in the matrix that does not involve either of the words in the pair that have relatedness $L_1$ and let $L_m$ be the largest word-pair relatedness value in the matrix that does not involve any of the words in the pairs that have relatedness $L_1, \ldots L_{m-1}$. Continue to determine values of $L_m$ until either of the sentences no longer has additional words to consider (and thus n will equal the lesser of i or j). Then, let the relatedness value of the two sentences being considered be $\Sigma_n L_n / \sqrt{(i \times j)}$ where $i$ and $j$ are the number of words in the two sentences.

In this way, step 152 creates V, the n×n matrix of relatedness values between pairs of sentences in the text.

Next, the topic segmentation module 106 performs the calculation of the rank matrix 154. This step creates R, an n×n matrix calculated from V. In particular, For each element $v_{i,j}$ in V, look at the m×m sub-matrix that is centered on $v_{i,j}$, where m is an odd number. In other words, look at the elements $v_{a,b}$ where a ranges from i−(m−1)/2 to i+(m−1)/2 and b ranges from j−(m−1)/2 to j+(m−1)/2;

Let $r_{i,j}$=(the number of elements in the said sub-matrix that are $<v_{i,j}$)/the number of elements considered in the matrix (not counting $v_{i,j}$ itself).

The calculation of the rank matrix 154, thus replaces the quantitative measurement $v_{i,j}$ with a qualitative one $r_{i,j}$ that depends upon the relatedness as compared to its local environment. Dividing by the number of elements within the sub-matrix properly treats the boundary cases near the edges of V and R. In the preferred embodiment of the present invention, values of M between 9 and 15 have been found to be most useful with no discernable difference between them.

After the calculation of the rank matrix 154, the topic segmentation module 106 begins an iterative, three-step process of density calculation 156, boundary insertion 158, and boundary rating 160. Each iteration of these three steps determines a single topic boundary. The iteration continues until the criteria are met for the termination of segmenting 162.

In the preferred embodiment of the present invention, a preparatory step is conducted before the density calculation 156. This preparatory step of calculating a rank-sum matrix RS has the single effect of improving the computational efficiency of the following three steps. RS is defined as the matrix in which each element $rs_{i,j}$ is the sum of the rank values for the smallest square sub-matrix of R whose diagonal is the diagonal of R and which includes the element $r_{i,j}$. (These are the sub-matrices that represent all of the comparison values for a continuous segment of sentences). In practice, RS is calculated via the following three steps to make it considerably more efficient:

1. $rs_{i,i}=r_{i,i}$ for each i in $\{1, \ldots, n\}$;
2. $rs_{i+1,i}=2r_{i+1,i}+rs_{i,i}+rs_{i+1,i+1}$
   $rs_{i,i+1}=rs_{i+1,i}$
   for each i in $\{1, \ldots, n-1\}$;
3. $rs_{i+k,i}=2r_{i+k,i}+rs_{i+k-1,i}+rs_{i+k,i+1}-rs_{i+k-1,i+1}$
   $rs_{i,i+k}=rs_{i+k,i}$
   for each k in $\{2, \ldots, n-1\}$, for each i in $\{1, \ldots, n-k\}$.

Next, the topic segmentation module begins the three-step iterative process of determining topic boundaries. The first of these steps is the density calculation 156. In this step, the parameter D(i), called the inside density at sentence i, is calculated for each of the sentences in the text that has not been identified as a segment boundary during previous iterations. The parameter D(i) is defined as follows:

Let B=$\{b(1), \ldots, b(k-1)\}$ be the sequence of sentence numbers that indicate which sentences have been identified as topic boundaries by the first k−1 iterations of steps 156-160 (where the values b(n) are in order from least to greatest). For example, if the 27$^{th}$ sentence was found to be the first sentence of a new topic segment in the first iteration and the 5$^{th}$ sentence was found to be the first sentence of a new topic segment in the second iteration, B would equal $\{5, 27\}$ during the third iteration. At step k, $D=[\Sigma^k_{i=1}(rs_{b(i),b(i-1)+1})]/[\Sigma^k_{i=1}(a_{b(i),b(i-1)+1})]$
where $b(0)=0$.

Once the inside density is calculated for each sentence that is not yet a segment boundary in step 156, step 158 determines a new boundary. The new boundary is simply at the segment with the largest value of D. This sentence number is then added to the list B.

Following the boundary insertion step 158, the boundary rating step 160 rates each boundary that is identified in step 158. This rating is then used to fine-tune the boundaries, to filter them for incorrectly identified boundaries, and to provide a measurement used to determine the ideal point at which to stop the iterative boundary calculation process. The basic premise of the boundary rating step 160 is that a good boundary will have high relatedness values between nearby sentences on the same side of the boundary and low relatedness values between sentences on opposite sides of the boundary. Furthermore, the most useful measure is the difference between these two relatedness measurements since using the difference factors out the baseline relatedness that varies across different portions of a document. This use of local information complements the more global information used to pick the boundaries.

The boundary rating for the boundary at sentence n, BR(n), is computed as follows:

Let size=(M−1)/2 where M is the constant used in calculating the rank matrix R in step 154.

Let WithinV(n)=Σ($V_{i,j}$) where either(n−size)≤i, j≤n or n<i, j≤(n+size).

Let CrossV(n)=Σ($V_{i,j}$) where either(n−size)≤i≤n and n<j≤(n+size) or vice versa.

BR(n)=WithinV(n)−CrossV(n).

Once this boundary rating BR(n) has been calculated for all of the boundaries that have been identified thus far, the boundary rating step 160 then computes a list of local maxima by calculating the boundary rating for segments near identified boundaries. These local maxima are used to adjust and to filter the identified boundaries. A boundary at sentence n is considered a local maximum if the following three conditions hold:

Let f1, f2, and f3 be constants and, once again, size=(M−1)/2;
1) BR(n)>f1*(average boundary rating);
2) BR(n)>BR(i) for (n−size)≤i≤(n+size) except those values of i for which there is a j between i and n for which BR(j)<(f2*BR(i));
3) BR(n)>BR(i) for (n−f3)≤i≤(n+f3).

In the preferred embodiment of the present invention, the values of these constants are f1=1.05, f2=0.85, f3=2.

Once the local maxima have been calculated, this set of sentences is used to adjust and to filter the identified boundaries. Each boundary that has been identified by the boundary insertion step 158 is compared to the set of local maxima. If it matches a local maximum, it is accepted. If it is not a local maximum but it is within two sentences of a local maximum, then that boundary is changed to the local maximum. If there is not a local maximum within two sentences of the boundary, then that boundary is rejected by excluding it from the eventual output of the module.

In some cases, a specific number of boundaries has been specified by the system administrator via the admin interface of the admin server 60. In most cases, however, the system must automatically terminate the iteration of steps 156-160. This termination happens in the termination of segmenting step 162 according to the following criteria:

Let d1, d2, and d3 be constants.

There have been more than d1 unique boundaries identified by step 158 (these must be unique boundaries because a sentence may be selected as a boundary more than once due to adjustment or rejection) AND EITHER The percentage of rejected boundaries is >d2, OR d3 unique boundaries in a row are rejected.

In the preferred embodiment of the present invention, the constants are set at d1=2, d2=⅓, and d3=2.

When the termination of segmenting step 162 determines that these criteria are met, then the iteration of steps 156-158 is terminated. The module then writes the existing list of boundaries into a topic boundary table 164 to be used by other modules of the system.

Named Entity Identification

Figure 12:
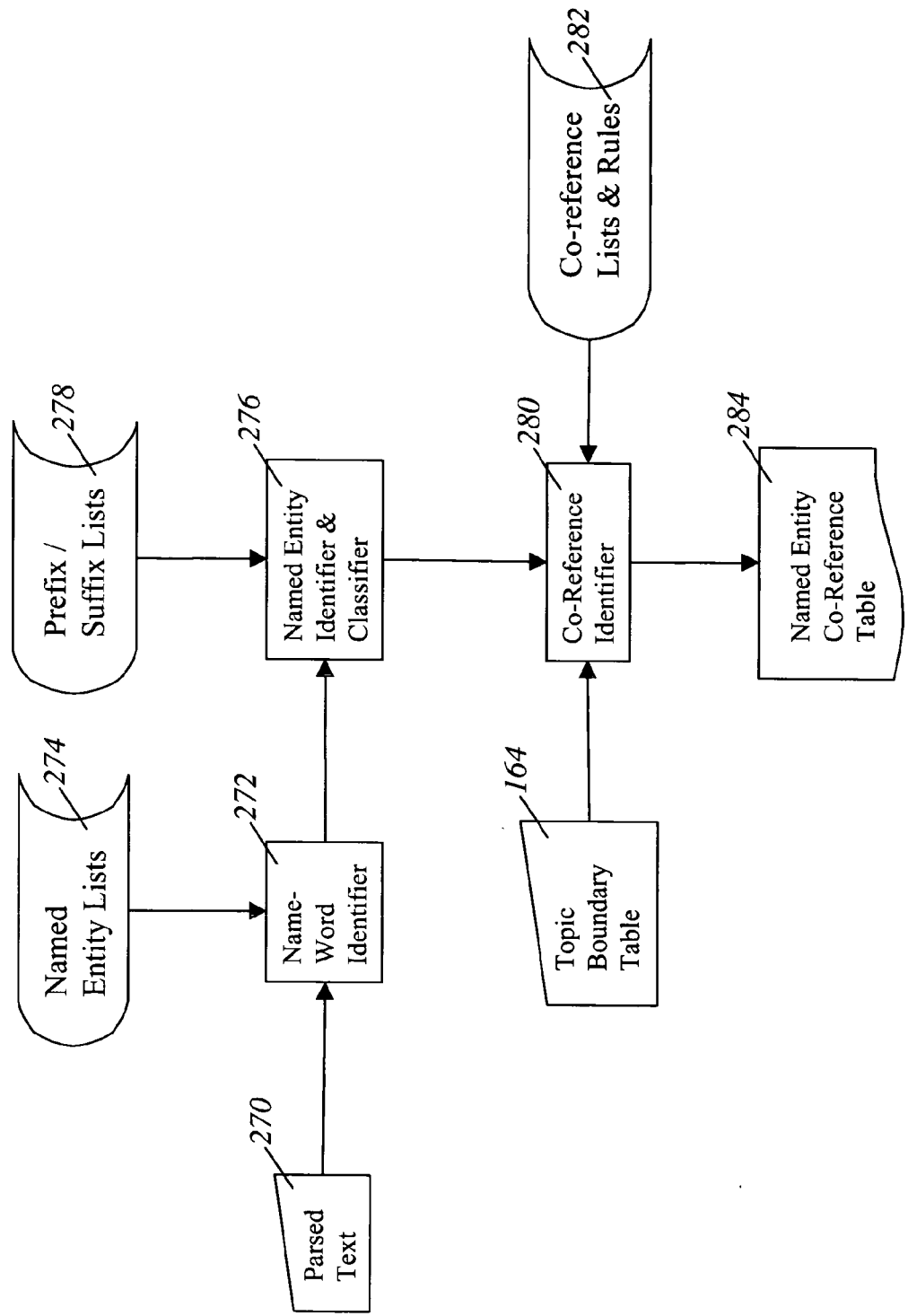
FIG. 12 is a process chart showing the operation process of the named entity identification module according to the present invention.

The named entity identification module 107 identifies named entities, classifies the entities by type, such as people, places, organizations, and events, and determines whether multiple instances of named entities are referring to the same entity (e.g. "Bill Clinton" and "the former president"). The operation of the named entity identification module 107 of the present invention is illustrated in FIG. 12.

The name-word identifier 272 reads in the parsed text 270 that was produced by the extraction modules 78 and parsed by the parsing module 92. It then checks the text against the named entity lists 274 and tags those words that may be part of named entities. The named entity lists 274 include lists of words and phrases that are often a part of named entities (e.g. "Robert" and "United States"). These lists also indicate the type of named entity that each word or phrase is a part of as well as qualitative or quantitative indications as to the likelihood that the given word or phrase is a named entity (e.g. the spoken word "Bill" could be the first name of a human, a legislative act, a part of a duck, a piece of currency, or an invoice). These likelihoods may vary according to register (e.g. content from the US Senate vs. the Audubon Society), and thus multiple values may be recorded and selected according to assumptions by the system or instructions by the system administrator.

Once the name-words are tagged within the text according to their likelihood of indicating one or more categories of named entity, the named entity identifier and classifier 276 makes a determination as to whether each potential named entity is actually a named entity. The identifier and classifier 276 makes use of lists of named entity prefix and suffix lists 278 and uses a complex rule-based system to make its determination.

For example, the words "Mrs. Sue Clayton" would be analyzed by the identifier and classifier 276 and identified as referring to a single named entity, in this case a person. "Sue" would have been tagged as a possible human first name and "Clayton" would have been tagged as a human name that could be either a first or last name. The fact that "Sue" precedes "Clayton" increases the likelihood that "Sue" is a first name and "Clayton" is a last name, but these two words could also be referring to legal action against a human with the first or last name of "Clayton" (recall that capitalization is not known for spoken words). Using the prefix/suffix lists 278, however, the identifier and classifier 276 would recognize that "Mrs." is a title of a female human that requires that it be followed by at least one name, the last of which is a human last name. In this example, the identifier and classifier 276 would also check for the presence of other prefixes and suffixes contained in the prefix/suffix lists 278 to exclude cases such as "the Mrs. Sue Clayton Memorial Scholarship" that would indicate that the named entity be further expanded to include the words "memorial scholarship" and be reclassified as a proper noun (or perhaps more specifically as a scholarship or financial entity) rather than as a human.

Once the named entities have been fully identified and classified, the co-reference identifier 280 inspects each named entity to determine whether it refer to the same entity as other named entities identified within the media file. For example, "Ms. Amanda Hourihan" may be referred to later within the file as "Ms. Hourihan" or simply "Amanda". The co-reference identifier 280 applies co-reference lists and rules 282 to know that human first names occurring after human first/last name pairs often refer to the same person, while analogous cases with other types of named entities do not follow such a pattern, such as "agriculture" occurring after "Agriculture Department." Similarly, the co-references lists and rules 282 indicate variations within words that are equivalent, such as "Mandy" referring to the same person as "Amanda."

Some of the co-reference rules 282 make use of topic boundaries, and thus the co-reference identifier 280 also uses the topic boundaries 164 that have been identified within the media file. For example, "Amanda" probably does not refer to "Ms. Amanda Hourihan" if "Amanda" occurs in a separate news story from "Ms. Amanda Hourihan". Once all co-references have been identified, the co-reference identifier 280 produces the output of the named entity identification module 107, namely the co-reference table 284. This table includes the named entities identified, classified, and grouped according to the entity to which they refer.

Anaphora Resolution

Figure 13:
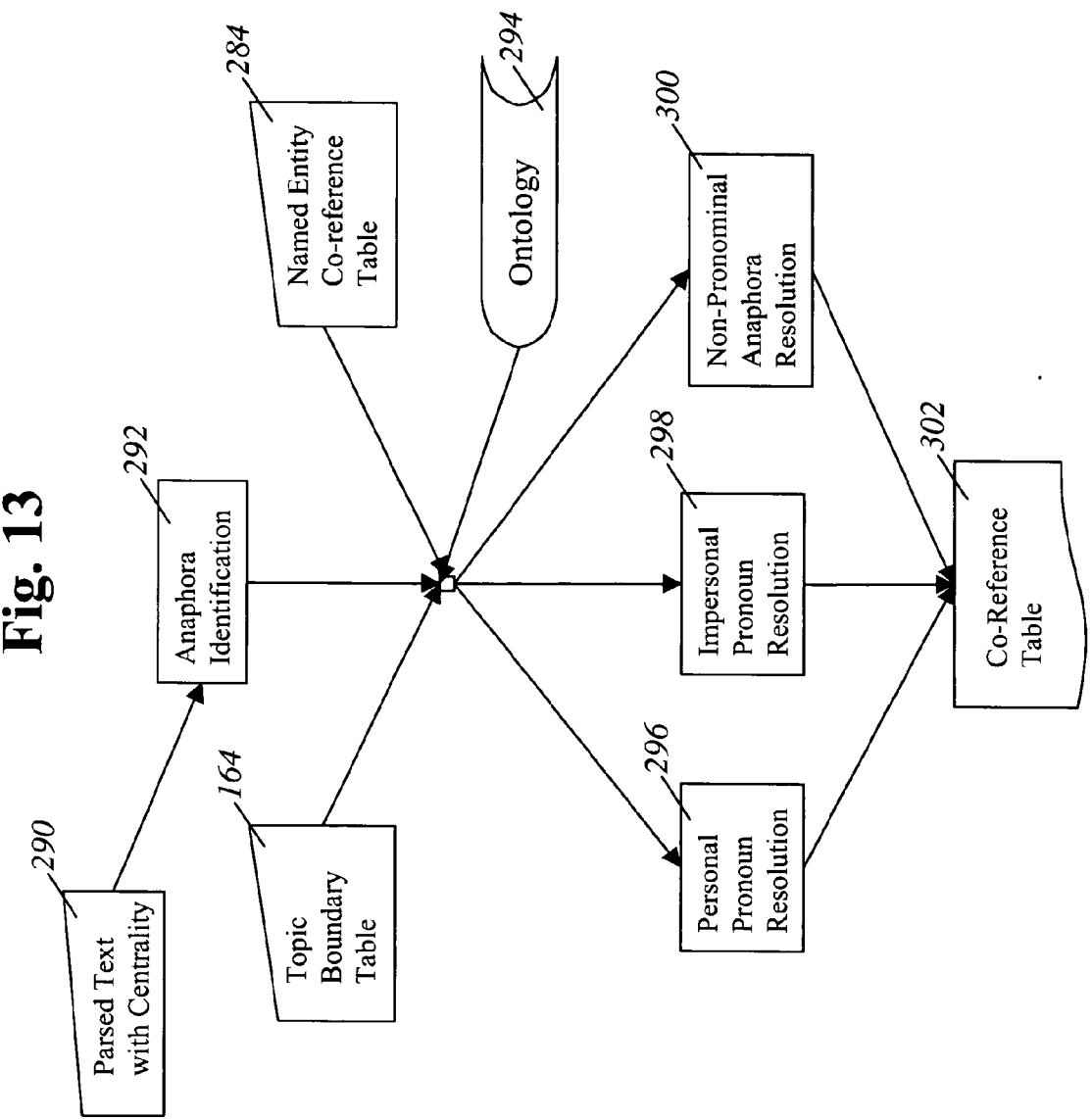
FIG. 13 is a process diagram showing the operation process of the anaphora resolution module according to the present invention.

The anaphora resolution module 108 adds to the named entity co-reference table 284 by identifying antecedents for all types of anaphora, including pronouns, definite references, and indirect references. FIG. 13 illustrates the operation of the anaphora resolution module 108. The module first identifies anaphora in step 292. This step reads in parsed text that includes centrality numbers, as represented by block 290. Step 292 identifies pronouns that are likely to be anaphora with antecedents, thus excluding, for example, non-referential uses of "it", "that," and "there" such as "I was told that . . . ." Step 292 also identifies potential definite and indirect references such as "the company" which may refer to a specific company previously mentioned.

Once the anaphora have been identified in step 292, the module resolves the anaphora by identifying antecedents. For this purpose, in addition to the text, the module uses other information, including the topic segment boundaries 164, the named entity co-reference table 284, and an ontology 294.

Potential antecedents for a given anaphor are located by stepping backward through the text and by looking at the named entities contained in the named entity co-reference table 284. Personal pronoun resolution in step 296 filters the potential antecedents according to whether they can represent a human, a group of humans, or a gendered non-human, as well as by number. For example, "she" cannot generally refer to "waiter," "John," "Mr. Lewis," or "waitresses." Some of this filtration makes use of an ontology in order to recognize, for example, that a "waiter" is an entity that is usually a male human.

Impersonal pronoun resolution in step 298 also uses the ontology to filter potential antecedents according to number. Step 298 also filters potential antecedents according to semantic constraints on the pronouns that can be detected by analyzing the sentence structure. For example, in resolving the pronoun "it" that occurs in the phrase "it runs," step 298 recognizes that because "it" is the subject of the verb "runs," then it must represent an entity that can run, such as a human, animal, human organization, machine, event, liquid, linear object, etc. Something that does not run, such as "the sun" is therefore not a potential antecedent and can be ignored.

The non-pronominal anaphora resolution step 300 resolves references that are not pronouns. This might include the definite reference "the ship," which might refer to "the Titanic" which occurs previously within the media. Step 300 makes use of the named entity co-reference table 284 and the ontology 294 to identify that entities such as "the Titanic" are examples of the definite reference in question, in this case "the ship." Step 300 resolves indirect anaphora as well. These include part/whole references, as in the sentences "This was the first time I had built a house of classical architecture. The awning is constructed of . . . " where "the awning" makes an implicit reference to the "house" of which it is a part. In other words, it is the awning of a very particular house that is the subject of the second sentence in the passage, and thus part of the subject of the sentence is assumed from the previous sentence. Such relationships are not strictly co-references, but they are references that convey continuation of topic and are therefore useful to the system.

In addition to the filtration described above, the resolution steps 296, 298, and 300 choose an antecedent according to the distance from the anaphor, grammatical comparisons between the anaphor and potential antecedent, and a measure of salience that is based upon the centrality of the potential antecedent. Once the anaphora are resolved, they are combined with the named-entity co-references from the named entity co-reference table 284 in a co-reference table 302 that indicates the antecedent to which they refer and the nature of the reference (e.g. direct vs. indirect).

Speech Logical Structure Analysis

The speech logical structure analysis module 110 analyses sentences for discourse cues that indicate some of the logical structure of the media file. These discourse cues are phrases or combinations of phrases that indicate a specific relationship between particular points in the text. The module searches for these cues by comparing each sentence within the speech contained in a media file to a hierarchical list of rules. If a sequence of conditions set forth in these rules is met by a particular sentence, then that sentence is tagged by the module according to its role in the logical structure of the media file.

The hierarchical list of rules is kept in a separate text file that is compiled into code automatically by the system so that experts can easily adjust and add to the rule base. Useful rules include those that locate: summary or conclusion statements (e.g. "In conclusion . . . "); indications of a particular logical relationship with the immediately previous text (e.g. "On the other hand . . . "); indications of the presence of, or a specific role within, a list (e.g. "Lastly . . . " or "There are three reasons why . . . "); explicit mentions of the main topic of a segment of the media (e.g. "Let's now address the issue of . . . "); identifications of the subsequent, current, or past speaker (e.g. "Now that we've finished that section of the meeting, I'll turn things over to Roger . . . "); and numerous other structures.

Visual Logical Structure Analysis

The visually conveyed information representations identified by the OCR module 88 and the HTML/SMIL parser 86 and further characterized by the character position module 89 are analyzed by visual logical structure analysis techniques in module 94. Such analysis recognizes the logical structure of on-screen lists, outlines, topics, etc., by separating all simultaneously visible text into elements and then ranking these elements according to prominence and an overall hierarchical relationship. This recognition is accomplished by grouping simultaneously visible text into logical objects, where a logical object is defined as a continuously readable set of text such as a phrase, sentence, or paragraph, by matching the size, spacing, font, alignment, and angle of the text. For example, the title of a slide would typically be a single logical object, and each of several bullet points would also be individual logical objects.

Once a set of simultaneously visible text is divided into logical objects, a hierarchical structure to the logical objects is discerned by analyzing the position on the page, size, indentation, alignment, and other characteristics of the logical objects. The hierarchical structures from multiple sets of simultaneously visible logical objects (such as multiple slides in a presentation) are then compared for logical connections. When connections are identified, the hierarchies are joined. For example, if one slide has the title "Video Analysis Software" and the following slide has the title "Video Analysis Software, cont.", the second slide is clearly a continuation of the first. If there were a bulleted list of points on each of these two slides, then the two lists could be joined in a single hierarchy under the equivalent title. Other examples of connections include the continuation of outlines and table of contents slides. In addition, the time interval during which each logical object is visible within the media is recorded and associated with that logical object.

Temporal Logical Structure Analysis

The temporal logical structure analysis module 112 adjusts the time intervals of visibility assigned to each visible logical object to create a time interval that is much more focused on the time interval over which that logical object is relevant to speech contained in the media file.

To illustrate, consider an information representation that is located in a certain logical object on a PowerPoint® slide that is visible during a particular portion of a timed media file. Often a speaker will address that logical object while the slide is visible. By comparing the words in the logical object with spoken words, the system can identify the time interval of the timed media that is most relevant to the logical object, which can then be used to adjust the length of the relevance interval. For example, if the visible logical object is a minor detail in a list, then it may be sufficient for the relevance interval to include a small portion of timed media, including the time when the speaker mentions the detail, rather than the entire time the information representation is visible on the screen. A natural extension of this adjustment process would be to create a feedback loop between the calculation of relevance intervals in step 116 with this adjustment of time intervals associated in logical objects in step 112.

Relevance Interval Calculation

The output of all of the analysis described above is saved in the raw data index 114 for the purpose of custom relevance interval creation and updates to the system. Once the output of all of this analysis has been collected, the system enters its final indexing step, the relevance interval calculation module 116. These relevance intervals, along with the virtual documents they compose, are fundamentally important parts of the present invention, and are stored as the search index database 120.

The goal of the relevance interval calculation 116 is to define the boundaries of time-code intervals to make each interval a minimal self-contained contextual unit with respect to the information representation. In other words, enough content must be included to make the context of the information representation clear and to convey the most important information concerning the information representation. At the same time, extraneous content that, while possibly relevant to information contained within the interval, does not pertain to the information representation, must be excluded.

Figure 14:
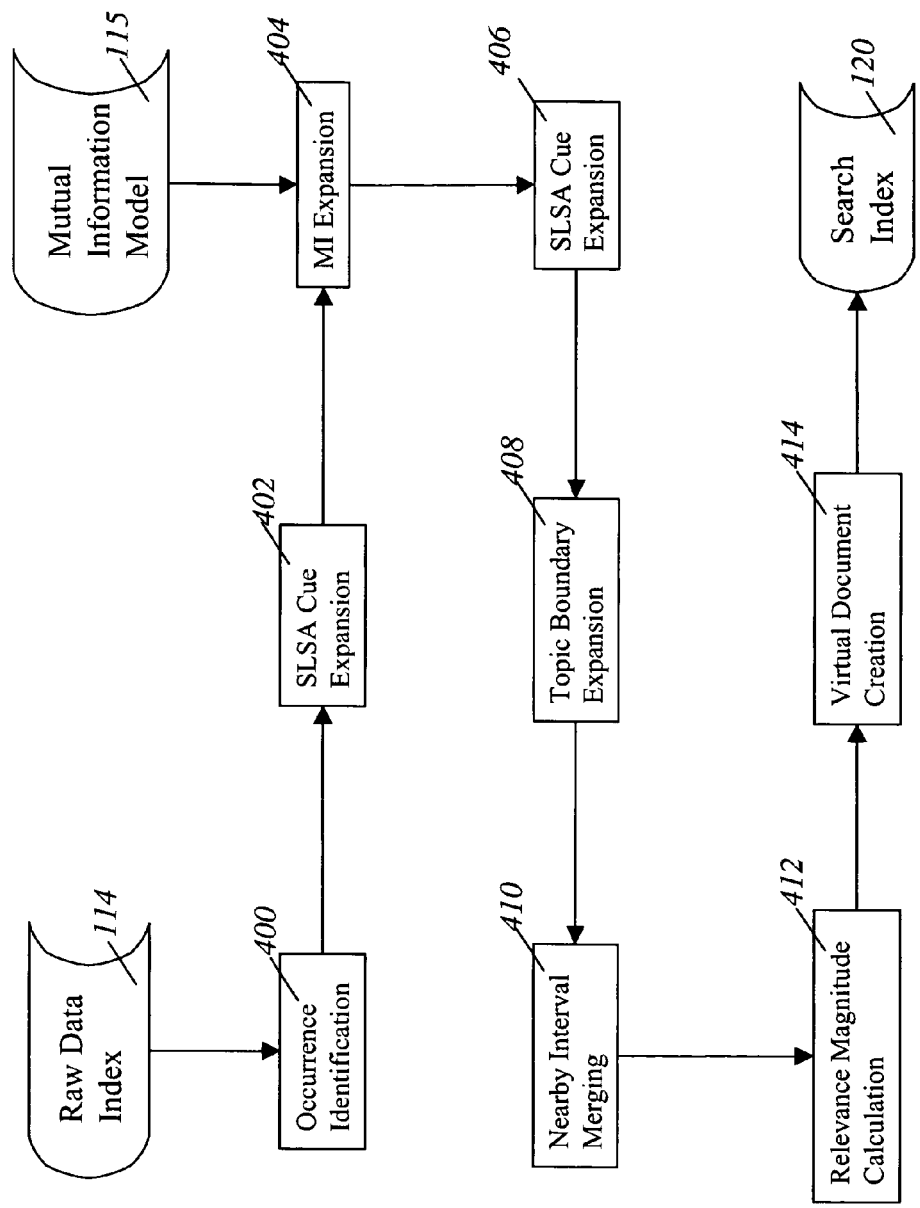
FIG. 14 is a process diagram showing the operation process of the relevance interval calculation module according to the present invention.

FIG. 14 depicts the operation of the relevance interval calculation module 116. These steps are operated for each unique information representation that has been identified within the media file. These steps operate for a given information representation (called the "indexing term") as follows: in the first step, occurrence identification step 400, the module locates every occurrence of the indexing term within the media file by time-code. For spoken occurrences of the indexing term, the list of occurrences includes the time interval of the sentence that includes the spoken occurrence. For visual occurrences of the indexing term, the list of occurrences includes the intervals of time that have been associated with the visual occurrence by the temporal logical structure analysis module 112.

Step 400 then adds to this list of occurrences by including similar intervals for the references that refer to an occurrence of the indexing term that were identified by the named entity identification module 107 and the anaphora resolution module 108 as referring to the same entity. After all occurrence and co-reference occurrence intervals have been identified, any such intervals that are adjacent or overlapping are joined. The resulting intervals act as the seeds for the relevance intervals being calculated and are passed along to the next step, speech logical structure analysis (SLSA) cue expansion, step 402.

SLSA cue expansion, step 402, expands each of the intervals created in step 400 by referencing the output of the speech logical structure module 110. If, for example, the first sentence of the interval is tagged as being semantically dependent upon the previous sentence (i.e. the first sentence of the interval would not be understandable by a viewer without the previous sentence), then the interval is expanded to include the previous sentence. Similarly, the end of the interval might be expanded if later sentences are clearly relevant or contextually integral based upon the logical structure cues. It is worth noting that sometimes such expansions are discontinuous. For example, the seed interval may be one item in a long list. While it may not be prudent to expand the interval to include the entire list, including the sentence that declares what the list is a list of might be integral in including sufficient contextual information to make the interval useful to a viewer. At the end of step 402, the system again checks for and unites any adjacent or overlapping intervals.

In step 404, the system expands the intervals through the use of the mutual information model 115. In particular, the system expands the beginning of each interval by looking at the sentences preceding the beginning of the interval and determining whether they contain information representations that have sufficiently high mutual information with the indexing term. In the preferred embodiment of the present invention, the system expands intervals by stepping back through blocks of one or more consecutive sentences previous to the beginning of the interval, where each block is approximately 8 seconds in length. As the system steps back, the interval is expanded to include the nth preceding block of sentences (everything between that block of sentences and the beginning of the interval as defined by step 402 is included as well) if the following two criteria are met:

Let maxSkipped and globalConstant be constants and P be the product of min(1, mutual information with the indexing term) for each of the information representations in the block of sentences.
1) At least one block of sentences between the nth block and the (n−maxSkipped)th block preceding the interval (inclusive) is already a part of the interval, either because it was a part of the interval as defined by step 402 or because it has become part of the interval already in step 404.
2) The product P and the largest mutual information between an information representation within the block of sentences and the indexing term is greater than globalConstant^n.

Similarly, step 404 expands the end of each interval by performing the analogous steps proceeding forward through the timed media file. In the preferred embodiment of the present invention, the constants maxSkipped and globalConstant are 3 and 1.95 respectively. After completing the expansion based upon the mutual information model 115, the system once more joins adjacent or overlapping intervals.

In step 406, the system once again expands intervals through the use of speech logical structure rules, as it did in step 402. Because the newly expanded intervals are more topically complete, in some cases the system may use somewhat different rules for this logical structure expansion than it did in performing step 402. Once again, the step is completed by combining adjacent or overlapping intervals.

Proceeding to step 408, the system adjusts any beginning and ending points of intervals that are sufficiently near topic boundaries to coincide with those boundaries. This adjustment includes the use of topic boundaries identified both by the topic segmentation module 106 and by the speech logical structure analysis module 110. This step simply expands the intervals to such topic boundaries when the following two criteria are met:
Let maxExpansion, expansionMultiple, and expansionConstant be constants.
1) The interval is less than maxExpansion seconds from the topic boundary in question.
2) The interval is less than [expansionMultiple*Length+expansionConstant] seconds from the topic boundary in question, where Length is the length of the interval.

Note that this adjustment of the relevance intervals is always an expansion, not a contraction; thus the beginnings of intervals are only adjusted backward through the media file and the ends of intervals are only adjusted forward through the media file. In the preferred embodiment of the present invention, the constants maxExpansion, expansionMultiple, and expansionConstant are 20 seconds, 0.1, and 8 seconds respectively for the expansion of the beginning of intervals and 30 seconds, 0.5, and 15 seconds respectively for the expansion of the ends of intervals.

In addition, step 408 expands intervals in another situation. If any number of relevance intervals combine to include more than C % of the timed media file between consecutive topic boundaries where C is a constant, those relevance intervals should be joined and expanded to include all of the media file between those two boundaries. In the preferred embodiment of the present invention, C is set at 100%.

Step 410 of the relevance interval calculation 116 module joins intervals that are sufficiently close together. Once again this is done by expanding intervals according to a criterion that is linearly dependent upon the length of the interval being considered. Two consecutive intervals are joined if the following two criteria are met:
Let maxExpansion, expansionMultiple, and expansionConstant be constants.
1) There is a gap less than maxExpansion seconds between the two consecutive intervals.
2) There is a gap of less than [expansionMultiple*Length+expansionConstant] seconds between the two consecutive intervals, where Length is the length of the longer interval.

In the preferred embodiment of the present invention, the constants maxExpansion, expansionMultiple, and expansionConstant are set at 45 seconds, 0, and 45 seconds respectively for the joining of consecutive intervals.

In addition to steps 400-410, some embodiments of the present invention will also include a final step in which symbolic relationships between pairs of information representations, such as ontological relationships, connections from a knowledge base or language model, or other relationships, are used to further adjust the relevance intervals of either or both of the information representations within each pair.

For example, given information representations A and B and relevance intervals <A1> and <B1> for each information representation A and B respectively, if
1. B is an example of A, given their grammatical and lexicographic context within the file (such as B="natural gas" and A="petroleum"),
2. <A1>⊃<B1>, and
3. <B1> is "almost all" of <A1>,
then <B1> may be adjusted to equal <A1>.

After calculating relevance intervals in steps 400-410, in step 412 the relevance interval calculation module 116 calculates a relevance magnitude for each relevance interval for each indexing term. These magnitudes, much like the relevance numbers associated with indexed static text documents, are used to rank the search results in an approximate order of usefulness, thereby greatly enhancing the usefulness of the search results. In addition, the magnitudes are used to make decisions concerning the combination of relevance intervals into virtual documents and creation of merged virtual documents in response to multiple information representation queries.

The basis of the magnitude calculations includes considerations similar to those used in standard static text document indexing, such as frequency of occurrence of the indexing term. Because the lack of statistical significance in this simple measure is far more acute in timed media than it is in text, however, far more complex considerations are also necessarily a part of the relevance magnitude calculation step 412. These calculations also take into account much of the other information in the raw data index 114, such as the parts of speech of the occurrences, the importance of the logical objects that include the indexing term, anaphoric and other references to the indexing term, mutual information between the indexing term and other information representations contained within the media, spoken or visual emphasis, frequency of highly related information representations, etc.

In addition, the relevance magnitude calculations 412 take into account other information that is specific to the context of the user or the user's search. In fact, multiple magnitudes are sometimes calculated for a single relevance interval or virtual document, with the particular magnitude used in a given search determined by user input or the known context of the user. For example, the library of timed media files held by a corporation may be used for a wide variety of purposes.

A customer sales representative may have very different viewing patterns than an employee in the legal department or an unknown person on the Internet who views the publicly available portion of the library. Some of these differences may translate into quantifiable preferences for certain types of content over other types (e.g. segments of different length or the importance of one meaning of a word over another). Weighting the magnitudes assigned to the relevance intervals and the virtual documents differently for different users can cater to such preferences.

In the preferred embodiment of the present invention, the context-generic calculation of the relevance magnitudes for relevance intervals derived from speech recognition is as follows:

Let c1, c2, and c3 be constants and $RICS(A,R)=\Sigma_{i \in R} cent(A_i)$, or the centrality sum of information representation A within the relevance interval R. Then, $$MI=[c1*\log Z+c2*\log Y+c3*AMI]/(c1*c2*c3),$$

where:
Z=max(1, RICS(IT,R)),
Y=max (1, RICS(anaphora that refer IT, R)),
AMI is a relevance interval-wide measurement of mutual information explained below, and
R is the relevance interval in question.

In other words, Z is a modified version of a count of the number of occurrences of the indexing term within the relevance interval. The count is weighted by the centrality of each occurrence in order to make it a truer measure of the degree to which the information representation "occurs" within the media. The maximum of this weighted count and 1 is used because in some relevance intervals that contain very few occurrences, the count may well be less than 1, which would make log Z negative in the definition of MI. While log Z is used in part because a) there is diminishing relative value for the purpose of judging relevance in each additional occurrence of the indexing term and b) the existence of the first occurrence is of little value because of the error-prone nature of speech recognition, it is not useful to actually decrease the magnitude of intervals that have a weighted occurrence sum of less than 1. Similarly, Y represents a weighted count of anaphoric occurrences of the indexing term.

The average mutual information measure, AMI, is a measurement of the degree to which the relevance interval as a whole pertains to the indexing term as indicated by mutual information shared between each sentence of the relevance interval and the indexing term. In particular, $$AMI=average(max(1,MMI)),$$

where the average is over all of the sentences in the relevance interval, and MMI is the maximum mutual information score between the indexing term and an information representation that is within the given sentence in the relevance interval but not a noun separated by fewer than two words from an occurrence of the indexing term itself.

The exclusion of nouns very nearby an indexing term eliminates unnaturally high mutual information values that stem from very common complete phrases of which the indexing term is a part. Averaging the maximum mutual information values from each sentence in the media then gives a sense of the overall connectedness of the relevance interval to the indexing term.

In the preferred embodiment of the present invention, the constants c1, c2, and c3 in the above relevance magnitude formula are set at 1, 0.5, and 0.5 respectively.

For the calculation of relevance magnitude in which not all of the occurrences of the indexing term in a given relevance interval are generated by speech recognition, 1 is added to Z to remove the discount of single-occurrence relevance intervals that is appropriate for error-prone speech recognition data.

Once the relevance intervals have been defined and adjusted in steps 400-410, and magnitudes have been calculated for each interval in step 412, virtual documents are created by combining relevance intervals in step 414. The distinction between this combination and what happens in the earlier definition of intervals is that here the intervals being combined are not adjacent, sufficiently close to each other, or contextually dependent. Because virtual documents, not relevance intervals, are the default result returned in response to a search, it is important to consider which relevance intervals should be combined and which should not. In some instances, it is appropriate to index a combination of the relevance intervals in a timed media file into a single virtual document because they all contain similar information or information pertaining to a common theme. In other cases, it may be that the contexts of the relevance intervals are sufficiently different that they should be indexed separately. Basically, the decision relies upon the following question: Given a user who is interested in one particular relevance interval, how likely is it that he/she will be equally interested in a second relevance interval as well?

The decision is made based upon factors such as the following:

1) The statistical similarity of information representations in the intervals. In particular, if information representations that are not very common and are not relevant to the entire file are located in both relevance intervals, then there is a higher likelihood of a contextual similarity between the relevance intervals. Another way of making the same comparison is to examine the number of other information representations that have relevance intervals that are closely synchronized to both of the intervals in question. If a number of information representations have similar sets of relevance intervals, it is very likely that the content between their relevance intervals is related.

2) Rules involving relevance intervals and the output of the natural language processing of various parts of the system. As in the case of the construction of relevance intervals, some embodiments of the present invention apply specialized language rules involving relevance intervals that can be invoked. For example:
   Let <B1> and <B2> be relevance intervals for the information representation B.
   Let F<Bi>≡{information representations W|∃<Wj>⊃<Bi> and B is an example of W}
   Then, if F<B1> is sufficiently similar to F<B2>, <B1> and <B2> should be a part of the same virtual document.

3) Rules involving knowledge about the media file. For example, if it is known that the indexed file is a recording of a single event, such as a hearing or a press conference, then it is likely that all of the intervals from a media file should be combined to give the viewer all of the information pertaining to the indexing term from that event. If the media is a lengthy stream of news broadcasts, however, then it is much less likely that relevance intervals from separate news stories or exposés should be combined simply because they are saved in the same media file.

4) Analysis of the relevance and quality of the relevance intervals. The relevance of relevance intervals can vary dramatically. This is especially true in the case where speech recognition is used to determine the spoken text contained in the media file, as a relevance interval may be created entirely based upon a speech recognition error and therefore have no connection whatsoever with the indexing term. If such intervals were combined with highly relevant intervals to form a virtual document, the virtual document may still be assigned a very high relevance magnitude, and yet the irrelevant relevance interval would significantly degrade the user experience.

In the preferred embodiment of the present invention, the relevance magnitudes of relevance intervals are compared to identify relevance intervals with comparatively very low relevance magnitudes. Such intervals are tagged as low quality relevance intervals and are not combined with relevance intervals with which they would otherwise be combined in a virtual document. A relevance interval is tagged as a low quality relevance interval if the following conditions are met:

Let maxBadRelevance and minGoodRelevance be constants.

i) At least one relevance interval in the media file for the given indexing term has a relevance magnitude>minGoodRelevance and ii) The relevance interval in question has a relevance magnitude<maxBadRelevance.

In the preferred embodiment of the present invention, the values of maxBadRelevance and minGoodRelevance are 2.7 and 4 respectively.

In unusual cases, virtual documents may also combine relevance intervals from multiple timed media files. This is most likely to occur when it is known that the multiple files are related in some way, such as a series of lectures on a single subject by the same lecturer or a series of updates on the same news story.

Lastly, it is important to note that the timed media indexing system of the present system differs from other systems in its ability to be customized. As the previous example concerning multiple relevance magnitudes suggests, value can be added to this system by customizing it to the context of a particular implementation. Such value stems from the fact that it is much more difficult to usefully index timed media files than static text documents (for which the search engines do not include customization).

Searching

Figure 15:
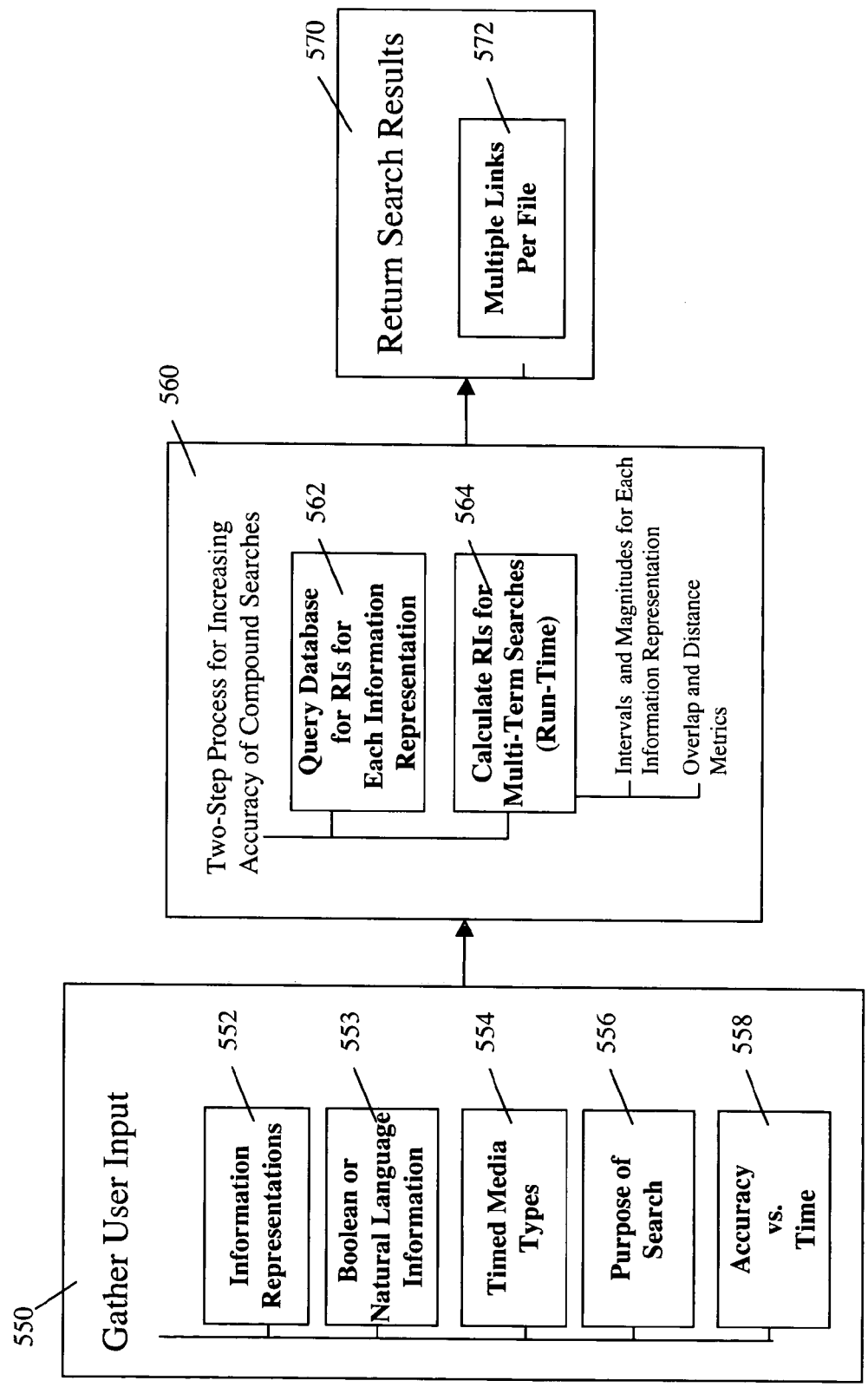
FIG. 15 is a block diagram showing the search aspect of the present invention.

Referring to FIG. 15, the search aspect of the present invention is illustrated. The search aspect encompasses the step of gathering the input query from the user in step 550. This step includes determining the information representations in block 552, detecting Boolean or natural language information in block 553, determining the types of timed media documents in block 554, evaluating the purpose of the search in block 556, and evaluating the accuracy of the recognition of the occurrences of the information representation(s) versus time in block 558.

The system then performs the process referred to in FIG. 5 for increasing the accuracy for compound searches in step 560. This includes querying the search index 120 for relevance intervals for each query information representation in step 562, and calculating relevance intervals for the multi-information representation search in step 564. Finally the system returns the results to the user in step 570, which may include providing multiple links per timed media file, in block 572.

Another aspect of the present invention is the advantage that an administrator does not need to be familiar with the actual calculations going on within the system to customize the system. Administrators can simply select parameters and preferences based upon the situation of the users, which the system will then translate into precise adjustments in the calculations. For example, during implementation of the system, an indication may be made that clients will primarily use the system for employee training as opposed to research. The administrator can then use this information to create multiple search indices 120 or relevance magnitudes from the same raw data index 114 and have the system selectively use each search index 120 in particular situations.

In addition to query information representations (referenced in block 200 in FIG. 5), a user can enter a number of optional parameters that will affect the search results. The system and method of the present invention will search by performing actions based upon the query information representations and any such additional inputs. The optional parameters include, but are not limited to, an instruction to only return whole documents (as opposed to virtual documents), a measure of the time the user is willing to wait in order to return more accurate results (block 558), an indication of whether to restrict the search to certain types of media (block 554), and information concerning the purpose of the search (block 556). (See also FIG. 6 for a user-interface screen of some of these options.)

If the search consists of only a single query information representation, the system will retrieve the virtual documents that are listed in the search index 120 as relevant to the query information representation. If more than one magnitude is listed in the search index 120, then the system will make a decision as to which to use based on any of the additional parameters entered by the user or any other knowledge about the user. The results will be displayed for the user in step 570 of FIG. 15 and step 230 of FIG. 5.

The process is considerably more complicated when the user enters multiple query information representations. Since a primary goal of the relevance interval approach is to return content that is precisely relevant to the search, one would ideally like to achieve a custom relevance interval for the specific combination of information representations entered by the user. However, the computational work required to calculate such relevance intervals for all combinations of potential query information representations for a given file is unobtainable.

The system and method of the present invention implements an approach that achieves the foregoing goal fairly well, but does not necessitate the same degree of computational work. The system queries the search index 120 for the virtual documents that are relevant to each query information representation (block 562). If the user requires immediate results (the default setting), then the system creates new virtual documents by adjusting the relevance intervals to take into account the multiple information representations. For example, given a timed media file that has sections relevant to both information representations in a two-information representation query, the system examines the relationship between the relevance intervals for each information representation. If the relevance intervals are relatively short and far apart from each other, the system may decide that no portion of the timed media file is likely to be relevant to both query information representations. If, however, there is high degree of overlap in the relevance intervals, it is most appropriate to return to the user a virtual document including the union of both relevance intervals. The degree of overlap, magnitude of relevance of each relevance interval, natural language processing information concerning the relationship between the query information representations, and the user-provided search parameters, are all used to decide what portions of the relevance intervals should be included, and what magnitude should be assigned to the newly created virtual document.

In the preferred embodiment of the present invention, virtual documents for queries with multiple information representations are created in the following way. First, all of the virtual documents for each query information representation is retrieved from the search index. These are compared with each other to determine if there are any sets of virtual documents that contain one virtual document for each query information representation and that have an interval of intersection that is contained in each virtual document within the set.

For each such set of intersecting virtual documents, a merged virtual document is created. This merged virtual document is calculated by taking the intersection of the set of virtual documents and then finding the minimal expansion of this intersection such that 1) each interval in the merged virtual document contains at least one occurrence of each query information representation;
2) the start time of each interval in the merged virtual document is the start time of a relevance interval for one of the query information representations; and
3) the end time of each interval in the merged virtual document is the end time of a relevance interval for one of the query information representations.

A magnitude is calculated for each interval in the merged virtual document. First, each interval in the intersection between the virtual documents for each query information representation is given a merge value (MV), which equals 1) 1 if the intersection interval contains an occurrence of all of the query information representations in a single sentence;
2) 0.8 if the intersection interval does not contains an occurrence of all of the query information representations in a single sentence, but the intersection interval does contain occurrences of all of the query information representations; or
3) 0.5 if the intersection interval does not contain occurrences of all of the query information representations.

Second, each interval in the intersection between the virtual documents for each query information representation is given a relevance magnitude (RM) that is the average of the relevance magnitude for each relevance interval in the intersecting virtual documents that includes the intersection interval. The final magnitude assigned to the merged virtual document is then the largest RM*MV for any of the intersection intervals.

The new merged virtual documents are then ordered according to relevance magnitude and returned to the user as search results in step 570.

The new virtual documents are more precise than simply returning the union of the virtual documents for each query information representation, but the new virtual documents are not nearly as precise as the individual information representation relevance interval calculations. As a result, the system gives the users the option of returning to the raw data index 114 to precisely calculate virtual documents for multi-information representation queries. Here the system uses the results from the search index 120 query to estimate which timed media files are most likely to be relevant. The system calculates new virtual documents for the multiple query information representations for only those timed media files that have been shown via the search index 120 to be sufficiently relevant to each individual query information representation.

The calculation from the raw data index 114 of new virtual documents is very similar to the original single-information representation calculations. The same parameters are considered in the calculations with the added constraint that all query information representations be taken into account. For example, the more closely correlated the appearance of two information representations, both semantically and temporally, the more highly relevant the given portion of the timed media file is considered. Such multi-information representation consideration also affects the use of natural language processing data. If one query information representation is a noun and another is an adjective, the presence of the given adjective modifying the given noun is perceived as significantly more relevant than the same adjective modifying a noun nearby or an independent occurrence of the given noun.

Similar to the creation of the search index 120, the calculations involved in multi-information representation searches are highly customizable (block 212 in FIG. 5). The selectivity of picking single-information representation relevance intervals as relevant to the multi-information representations, the amount of calculation performed on raw data, and numerous other parameters can be set by implementers and system administrators. In an e-learning system, a return of more inclusive multi-information representation virtual documents is desirable than in an implementation used for finding specific medical information. For each such implementation, the setting of the customizable parameters is crucial in fine-tuning the effectiveness of the system.

An additional feature of the system is the ability to save or pass along to other users a single virtual document or set of search results. Such a capability is especially useful where the multi-information representation search takes time to compile. The system may automatically store precisely calculated multi-information representation searches that are likely to recur, for quick access by subsequent users. In addition, the user can save the results at his/her own station for subsequent manipulation and review.

The user can further instruct the system to create actual media files from particularly useful virtual documents for use by other users or on other computer systems. This eliminates the need for continually utilizing the searching components of the present system to produce the virtual document multiple times for different users or for multiple accesses by the same user, and allows the virtual document to be transferred, used elsewhere, and edited as a normal timed media file.

Playback

Figure 16:
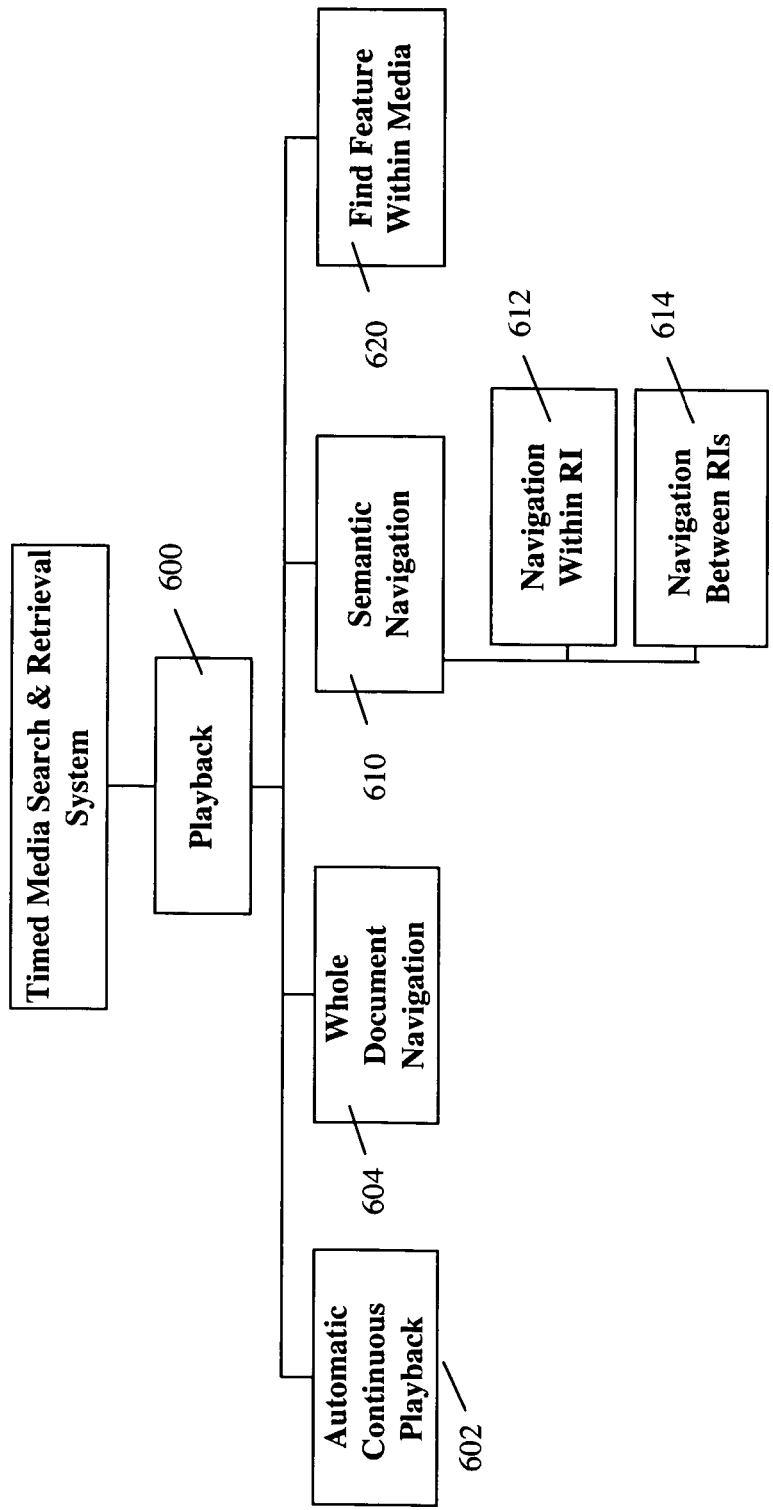
FIG. 16 is a block diagram showing the playback aspect of the present invention.

The displayed results of a search include links to each virtual document. Because these virtual documents are not timed media files, but simply pointers to the time-code of actual timed media files, additional features must be included in the system in order to utilize the advantages of the system. FIG. 16 shows a hierarchy of playback features. When a user follows a link to a virtual document, the appropriate media player, i.e. QuickTime®, NetMeeting®, RealPlayer®, Windows Media Player®, etc., begins playing the streamed media, the feature represented by block 600. The virtual document will be automatically played continuously, block 602, despite the fact that it may comprise several discontinuous sections of one or more timed media files. Furthermore, an additional navigation bar can appear below the media player indicating the portion of the document that is currently being played. In block 604 of FIG. 16, the player's standard navigation bar allows the user to navigate within the whole document from which the virtual document being played was created. Additional buttons can be provided to allow semantic navigation in block 610. The semantic navigation 610 includes navigating within relevance intervals, block 612, and between relevance intervals, block 614. The user can thus easily find the desired feature within the timed media file, block 620. The user can therefore easily navigate the portions of the timed media files that have been deemed relevant to the query information representation(s), while also easily being able to view the rest of the original timed media file.

Having described several embodiments of the method and system for searching and retrieving timed media based upon relevance intervals in accordance with the present invention, it is believed that other modifications, variations and changes will be suggested to those skilled in the art in view of the description set forth above. For example, as speech recognition software improves by including additional capabilities such as the ability to recognize added emphasis on words, the present invention can utilize these new capabilities to aid in determining relevance intervals. It is therefore to be understood that all such variations, modifications and changes are believed to fall within the scope of the invention as defined in the appended claim.

What is claimed is:

1. A method comprising:
   receiving, by a computing device, a file comprising audio;
   recognizing speech in the file comprising the audio;
   parsing the speech to determine a grammatical structure of the speech;
   based on the grammatical structure of the speech, dividing the speech into sentences; and
   determining a topic of one of the sentences.

2. The method of claim 1, wherein dividing the speech into sentences comprises using a set of rules to determine a most likely sentence boundary for the speech.

3. The method of claim 2, wherein the set of rules to determine the most likely sentence boundary for the speech comprises rules for determining sentence boundaries based upon one or more of word sequences, pauses, parts of speech, grammatical data, and prosodic cues.

4. The method of claim 2, comprising:
   determining a sentence number of a particular sentence in the speech by counting a number of sentences in the speech before the particular sentence.

5. The method of claim 1, comprising:
   determining a pronoun in the speech; and
   determining a reference to which the pronoun in the speech refers.

6. The method of claim 5, wherein the determining the reference to which the pronoun in the speech refers comprises:
   determining a group of potential antecedents for the pronoun in the speech; and
   filtering the group of potential antecedents for the pronoun based on whether each of the potential antecedents can represent one or more of a human, a group of humans, or a gendered non-human.

7. The method of claim 6, wherein filtering the group of potential antecedents for the pronoun is further based on one or more semantic constraints on the potential antecedents.

8. A method comprising:
   receiving, by a computing device, a file comprising a video;
   identifying speech in the video;
   determining a grammatical structure of the speech in the video;
   based on the grammatical structure of the speech in the video, determining one or more sentences in the speech; and
   determining a concept of one of the one or more sentences.

9. The method of claim 8, comprising:
   reducing words of the speech in the video to canonical form; and
   adding the canonical form of the words of the speech to an index.

10. The method of claim 8, comprising:
    determining a grammatical structure of the one or more sentences in the speech; and
    based on the grammatical structure of the one or more sentences in the speech, determining centrality of the concept of the one of the one or more sentences.

11. The method of claim 10, wherein determining the grammatical structure of the one or more sentences in the speech comprises:
    determining a part of speech of each word in the one or more sentences.

12. The method of claim 11, comprising:
    assigning a centrality weight to each word in the one or more sentences, based on the part of speech of each word in the one or more sentences.

13. The method of claim 8, comprising:
    determining a semantic meaning of each word in the one or more sentences in the speech; and
    filtering words in the one or more sentences based on the semantic meaning of each word.

14. The method of claim 13, wherein filtering the words in the one or more sentences based on the semantic meaning of each word comprises:
    determining whether a word of the words in the one or more sentences is a meaningful word; and
    excluding the word if the word is not a meaningful word.

15. The method of claim 14, wherein the meaningful word is not a conjunction, an article, or a preposition.

16. A method comprising:
    receiving, by a computing device, a media file;
    receiving a text transcript associated with the media file;
    parsing the text transcript to determine a grammatical structure of words in the text transcript;
    based on the grammatical structure of the words in the text transcript, dividing the words in the text transcript into sentences; and
    determining a topic of one of the sentences.

17. The method of claim 16, comprising:
    determining a corpus based on centrality of a concept in a sentence of the sentences; and
    creating a search index using the corpus.

18. The method of claim 17, comprising:
    determining a centrality score for each word in the sentence based on a structure of the sentence; and
    determining the centrality of the concept in the sentence based on the centrality score for each word in the sentence.

19. The method of claim 16, comprising:
    determining, for each of the sentences, whether the sentence is a topic boundary.

20. The method of claim 16, comprising:
 determining a plurality of named entities in the text transcript associated with the media file; and
 determining whether the plurality of named entities in the text transcript are referring to a same entity.

\* \* \* \* \*